United States Patent
Kim

(10) Patent No.: US 12,075,480 B2
(45) Date of Patent: Aug. 27, 2024

(54) METHOD AND DEVICE FOR TRANSMITTING AND RECEIVING PPDU ON BASIS OF FDD IN WIRELESS LAN SYSTEM

(71) Applicant: LG ELECTRONICS INC., Seoul (KR)

(72) Inventor: Jinmin Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 18/455,088

(22) Filed: Aug. 24, 2023

(65) Prior Publication Data

US 2023/0403743 A1 Dec. 14, 2023

Related U.S. Application Data

(63) Continuation of application No. 17/930,060, filed on Sep. 6, 2022, now Pat. No. 11,765,773, which is a continuation of application No. 17/052,165, filed as application No. PCT/KR2019/006205 on May 23, 2019, now Pat. No. 11,452,135.

(51) Int. Cl.
| | |
|---|---|
| *H04W 84/12* | (2009.01) |
| *H04L 1/1607* | (2023.01) |
| *H04L 5/00* | (2006.01) |
| *H04L 5/14* | (2006.01) |
| *H04W 74/0816* | (2024.01) |

(52) U.S. Cl.
CPC ....... *H04W 74/0816* (2013.01); *H04L 1/1621* (2013.01); *H04L 5/0053* (2013.01); *H04L 5/14* (2013.01); *H04W 84/12* (2013.01)

(58) Field of Classification Search
CPC ................................. H04W 84/12; H04L 5/14
USPC ......................................................... 370/329
See application file for complete search history.

(56) References Cited

U.S. PATENT DOCUMENTS

2021/0352722 A1* 11/2021 Xin ....................... H04W 72/56

* cited by examiner

*Primary Examiner* — Angel T Brockman
(74) *Attorney, Agent, or Firm* — LEE, HONG, DEGERMAN, KANG & WAIMEY

(57) ABSTRACT

A method and a device for transmitting and receiving a PPDU on the basis of an FDD in a wireless LAN system are presented. Particularly, an AP transmits a trigger frame to a first STA and a second STA. The AP transmits a first downlink (DL) PPDU to the first STA on the basis of the trigger frame. The AP transmits a second DL PPDU to the second STA on the basis of the trigger frame. The AP receives a first uplink (UL) PPDU from the second STA on the basis of the trigger frame. The trigger frame includes bandwidth information of a primary channel and a secondary channel. The first DL PPDU is transmitted through the primary channel. The second DL PPDU and the first UL PPDU are transmitted through the secondary channel. The first and second DL PPDU are simultaneously transmitted. The first UL PPDU is received after a preset period after the second DL PPDU is transmitted.

20 Claims, 25 Drawing Sheets

FIG. 1
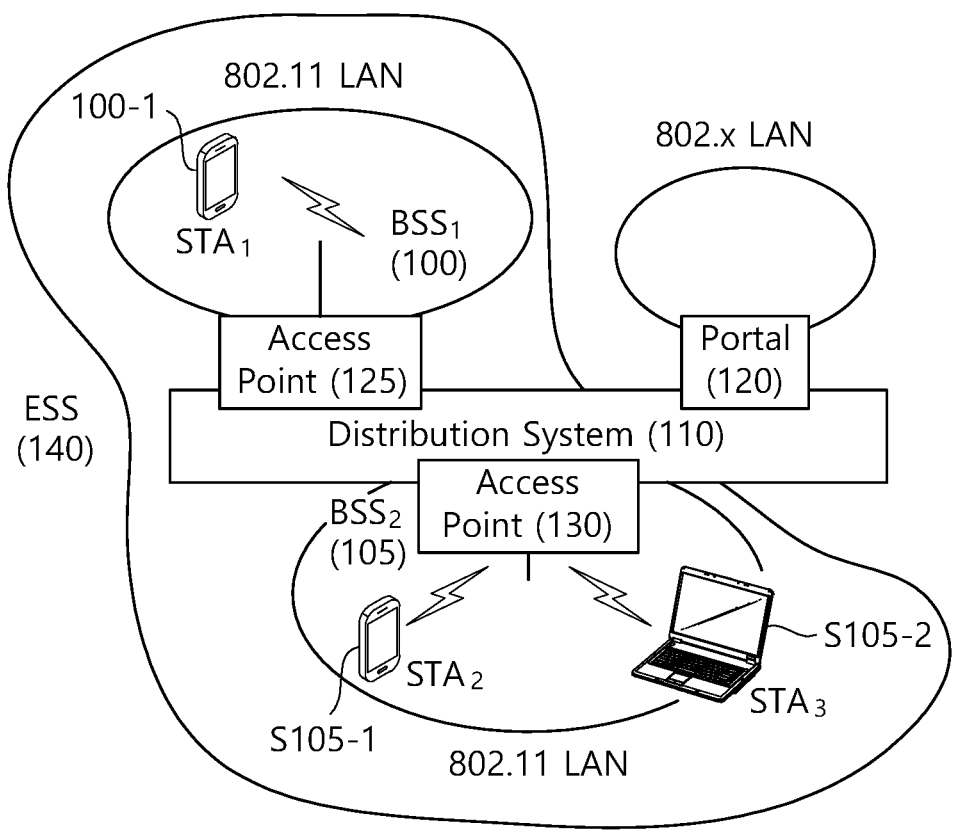
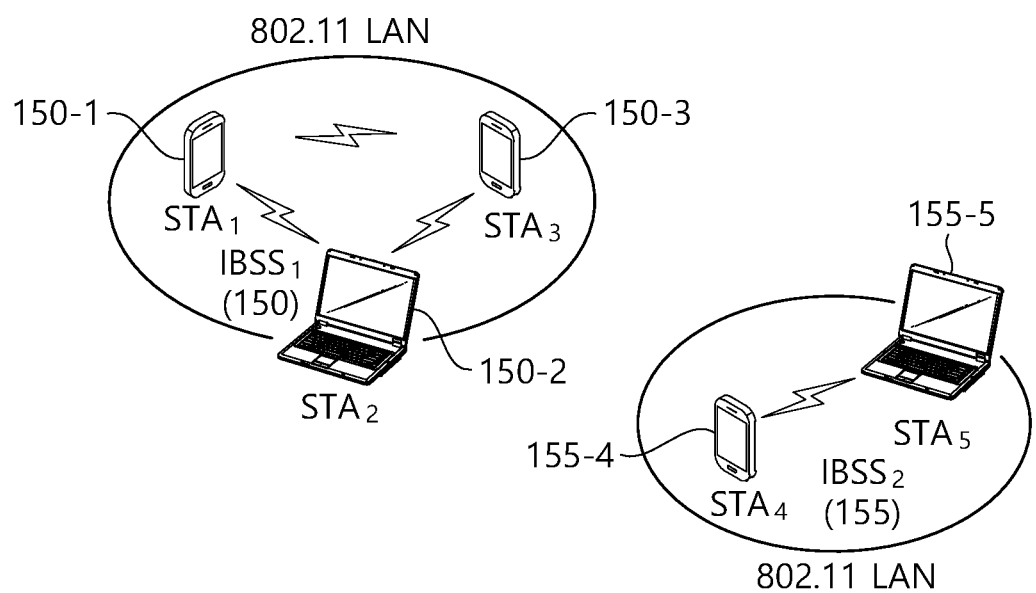

METHOD AND DEVICE FOR TRANSMITTING AND RECEIVING PPDU ON BASIS OF FDD IN WIRELESS LAN SYSTEM

CROSS-REFERENCE TO RELATED APPLICATIONS

This application is a continuation of U.S. patent application Ser. No. 17/930,060, filed on Sep. 6, 2022, which is a continuation of U.S. patent application Ser. No. 17/052,165, filed on Oct. 30, 2020, now U.S. Pat. No. 11,452,135, which is the National Stage filing under 35 U.S.C. 371 of International Application No. PCT/KR2019/006205, filed on May 23, 2019, which claims the benefit of earlier filing date and right of priority to Korean Application No. 10-2018-0058191, filed on May 23, 2018, the contents of which are all hereby incorporated by reference herein in their entirety.

BACKGROUND

Field

The present specification relates to a scheme of performing frequency division duplex (FDD) in a wireless local area network (WLAN) system, and more particularly, to a method and apparatus for transmitting and receiving a physical layer protocol data unit (PPDU) by using the FDD scheme in the WLAN system.

Related Art

Discussion for a next-generation wireless local area network (WLAN) is in progress. In the next-generation WLAN, an object is to 1) improve an institute of electronic and electronics engineers (IEEE) 802.11 physical (PHY) layer and a medium access control (MAC) layer in bands of 2.4 GHz and 5 GHz, 2) increase spectrum efficiency and area throughput, 3) improve performance in actual indoor and outdoor environments such as an environment in which an interference source exists, a dense heterogeneous network environment, and an environment in which a high user load exists, and the like.

An environment which is primarily considered in the next-generation WLAN is a dense environment in which access points (APs) and stations (STAs) are a lot and under the dense environment, improvement of the spectrum efficiency and the area throughput is discussed. Further, in the next-generation WLAN, in addition to the indoor environment, in the outdoor environment which is not considerably considered in the existing WLAN, substantial performance improvement is concerned.

In detail, scenarios such as wireless office, smart home, stadium, Hotspot, and building/apartment are largely concerned in the next-generation WLAN and discussion about improvement of system performance in a dense environment in which the APs and the STAs are a lot is performed based on the corresponding scenarios.

In the next-generation WLAN, improvement of system performance in an overlapping basic service set (OBSS) environment and improvement of outdoor environment performance, and cellular offloading are anticipated to be actively discussed rather than improvement of single link performance in one basic service set (BSS). Directionality of the next-generation WLAN means that the next-generation WLAN gradually has a technical scope similar to mobile communication. When a situation is considered, in which the mobile communication and the WLAN technology have been discussed in a small cell and a direct-to-direct (D2D) communication area in recent years, technical and business convergence of the next-generation WLAN and the mobile communication is predicted to be further active.

SUMMARY

The present specification proposes a method and apparatus for transmitting and receiving a physical layer protocol data unit (PPDU), based on frequency division duplex (FDD), in a wireless local area network (WLAN) system.

An example of the present specification proposes a method of transmitting and receiving a PPDU, based on FDD.

The present embodiment may be performed in a network environment in which a next-generation WLAN system is supported. The next-generation WLAN system is a WLAN system evolved from an 802.11ax system, and may satisfy backward compatibility with the 802.11ax system.

The present embodiment may be performed in a transmitting device, and the transmitting device may correspond to an access point (AP). A receiving device of the present embodiment may correspond to a station (STA) (non-AP STA) having FDD capability.

The AP transmits a trigger frame to a first STA and a second STA.

The AP transmits a first downlink (DL) PPDU to the first STA, based on the trigger frame.

The AP transmits a second DL PPDU to the second STA, based on the trigger frame.

The AP receives a first uplink (UL) PPDU from the second STA, based on the trigger frame.

The trigger frame includes bandwidth information of a primary channel and secondary channel.

The first DL PPDU is transmitted through the primary channel, and the second DL PPDU and the first UL PPDU are transmitted through the secondary channel.

The first and second DL PPDUs are simultaneously transmitted. The first DL PPDU and the second DL PPDU may have the same transmission start time, but a transmission end time may be different from each other.

The first UL PPDU is received when a pre-set duration elapses after the second DL PPDU is transmitted. That is, the first UL PPDU and the second DL PPDU are identical in a frequency domain, and may be identified in a time domain.

The trigger frame, the first DL and second DL PPDUs, and the first UL PPDU may be a frame or PPDU used in the 802.11ax system, or may be newly defined in the next-generation WLAN system.

The first DL PPDU may include a first preamble and a first data field. The second DL PPDU may include only a second preamble, or may include the second preamble and a quality of service (QoS) null frame.

The second preamble may be a preamble obtained by duplicating the first preamble.

The second preamble may include a legacy-short training field (L-STF), a legacy-long training field (L-LTF), a legacy-signal (L-SIG), and an FDD-signal (FDD-SIG). The FDD-SIG may include bandwidth information of the primary channel and secondary channel.

The pre-set duration may be set to a first duration or a second duration. The first duration may be a short inter-frame space (SIFS), and the second duration may be a duration having a value greater than the SIFS and less than a point coordination function inter-frame space (PIFS).

The first UL PPDU may include only a second data field, or may include only an ACK frame for the first DL PPDU, or may include a frame obtained by aggregating the second data field and the ACK frame. The ACK frame may include a block Ack (BA) frame.

The first UL PPDU may not include an ACK frame for the second DL PPDU. In practice, the ACK frame for the second DL PPDU is not required.

A transmission end time of the first UL PPDU may be equal or prior to a transmission end time of the first DL PPDU. The L-SIG may include information on the transmission end time of the first DL PPDU.

The trigger frame may further include information on a center frame, a channel number of the primary channel and secondary channel, indication information of DL and UL PPDUs, duration information of the DL and UL PPDUs, and transmission opportunity (TXOP) information of the DL and UL PPDUs.

The trigger frame may include a first trigger frame transmitted in the primary channel and a second trigger frame transmitted in the secondary channel.

The second trigger frame may be obtained by duplicating the first trigger frame.

If the second trigger frame is aggregated with a physical layer service data unit (PSDU) included in the second DL PPDU, the first UL PPDU may be received when an SIFS elapses after the trigger frame is transmitted. In this case, the second trigger frame may be composed of independent trigger frames, instead of duplicating the first trigger frame.

The present specification proposes a scheme of transmitting and receiving a physical layer protocol data unit (PPDU), based on frequency division duplex (FDD), in a wireless local area network (WLAN) system.

According to an embodiment proposed in the present specification, since a PPDU is transmitted and received based on FDD by using a trigger frame or a request to send (RTS)/clear to send (CTS) frame, fast UL transmission is possible in a scheduling manner without channel contention. As a result, a throughput of UL transmission can be guaranteed, and a problem of low-latency communication can be solved.

BRIEF DESCRIPTION OF THE DRAWINGS

FIG. 1 is a conceptual view illustrating the structure of a wireless local area network (WLAN).

DESCRIPTION OF EXEMPLARY EMBODIMENTS

Figure 2:
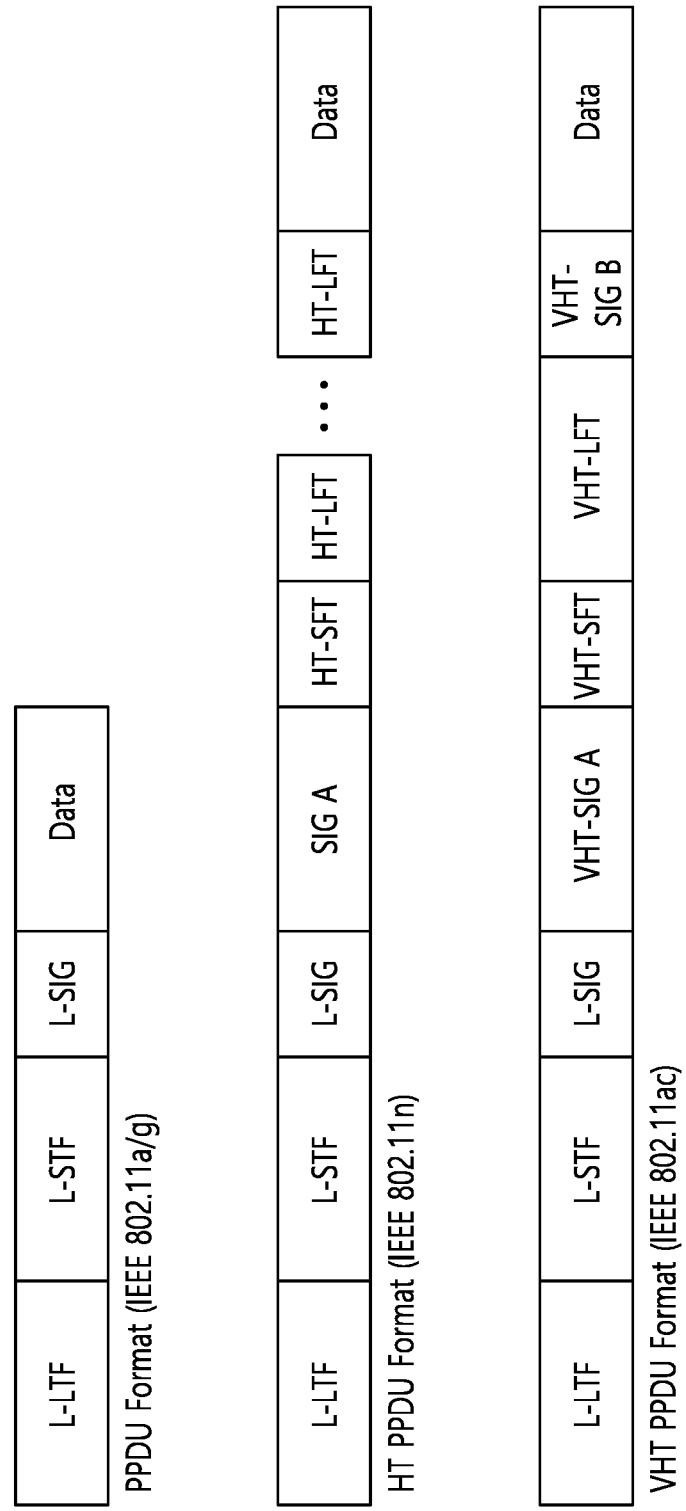
FIG. 2 is a diagram illustrating an example of a PPDU used in an IEEE standard.

FIG. 1 is a conceptual view illustrating the structure of a wireless local area network (WLAN).

An upper part of FIG. 1 illustrates the structure of an infrastructure basic service set (BSS) of institute of electrical and electronic engineers (IEEE) 802.11.

Referring the upper part of FIG. 1, the wireless LAN system may include one or more infrastructure BSSs 100 and 105 (hereinafter, referred to as BSS). The BSSs 100 and 105 as a set of an AP and an STA such as an access point (AP) 125 and a station (STA1) 100-1 which are successfully synchronized to communicate with each other are not concepts indicating a specific region. The BSS 105 may include one or more STAs 105-1 and 105-2 which may be joined to one AP 130.

The BSS may include at least one STA, APs providing a distribution service, and a distribution system (DS) 110 connecting multiple APs.

The distribution system 110 may implement an extended service set (ESS) 140 extended by connecting the multiple BSSs 100 and 105. The ESS 140 may be used as a term indicating one network configured by connecting one or more APs 125 or 230 through the distribution system 110. The AP included in one ESS 140 may have the same service set identification (SSID).

A portal 120 may serve as a bridge which connects the wireless LAN network (IEEE 802.11) and another network (e.g., 802.X).

In the BSS illustrated in the upper part of FIG. 1, a network between the APs 125 and 130 and a network between the APs 125 and 130 and the STAs 100-1, 105-1, and 105-2 may be implemented. However, the network is configured even between the STAs without the APs 125 and 130 to perform communication. A network in which the communication is performed by configuring the network even between the STAs without the APs 125 and 130 is defined as an Ad-Hoc network or an independent basic service set (IBSS).

A lower part of FIG. 1 illustrates a conceptual view illustrating the IBSS.

Referring to the lower part of FIG. 1, the IBSS is a BSS that operates in an Ad-Hoc mode. Since the IBSS does not include the access point (AP), a centerized management entity that performs a management function at the center does not exist. That is, in the IBSS, STAs 150-1, 150-2, 150-3, 155-4, and 155-5 are managed by a distributed manner. In the IBSS, all STAs 150-1, 150-2, 150-3, 155-4, and 155-5 may be constituted by movable STAs and are not permitted to access the DS to constitute a self-contained network.

The STA as a predetermined functional medium that includes a medium access control (MAC) that follows a regulation of an Institute of Electrical and Electronics Engineers (IEEE) 802.11 standard and a physical layer interface for a radio medium may be used as a meaning including all of the APs and the non-AP stations (STAs).

The STA may be called various a name such as a mobile terminal, a wireless device, a wireless transmit/receive unit (WTRU), user equipment (UE), a mobile station (MS), a mobile subscriber unit, or just a user.

Meanwhile, the term user may be used in diverse meanings, for example, in wireless LAN communication, this term may be used to signify a STA participating in uplink MU MIMO and/or uplink OFDMA transmission. However, the meaning of this term will not be limited only to this.

FIG. 2 is a diagram illustrating an example of a PPDU used in an IEEE standard.

As illustrated in FIG. 2, various types of PHY protocol data units (PPDUs) may be used in a standard such as IEEE a/g/n/ac, etc. In detail, LTF and STF fields include a training signal, SIG-A and SIG-B include control information for a receiving station, and a data field includes user data corresponding to a PSDU.

In the embodiment, an improved technique is provided, which is associated with a signal (alternatively, a control information field) used for the data field of the PPDU. The signal provided in the embodiment may be applied onto high efficiency PPDU (HE PPDU) according to an IEEE 802.11ax standard. That is, the signal improved in the embodiment may be HE-SIG-A and/or HE-SIG-B included in the HE PPDU. The HE-SIG-A and the HE-SIG-B may be represented even as the SIG-A and SIG-B, respectively. However, the improved signal proposed in the embodiment is not particularly limited to an HE-SIG-A and/or HE-SIG-B standard and may be applied to control/data fields having various names, which include the control information in a wireless communication system transferring the user data.

Figure 3:
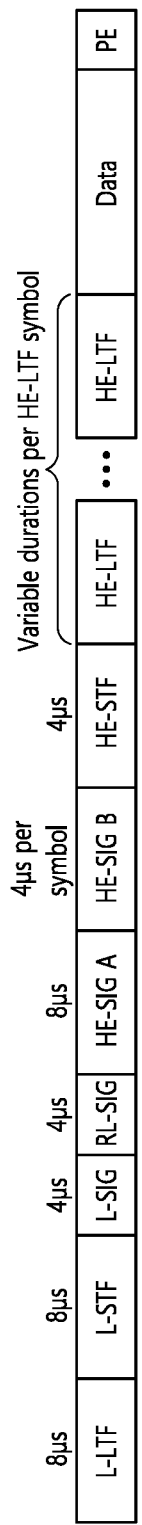
FIG. 3 is a diagram illustrating an example of an HE PDDU.

FIG. 3 is a diagram illustrating an example of an HE PDDU.

The control information field provided in the embodiment may be the HE-SIG-B included in the HE PPDU. The HE PPDU according to FIG. 3 is one example of the PPDU for multiple users and only the PPDU for the multiple users may include the HE-SIG-B and the corresponding HE SIG-B may be omitted in a PPDU for a single user.

As illustrated in FIG. 3, the HE-PPDU for multiple users (Mils) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted during an illustrated time period (that is, 4 or 8 μs).

More detailed description of the respective fields of FIG. 3 will be made below.

Figure 4:
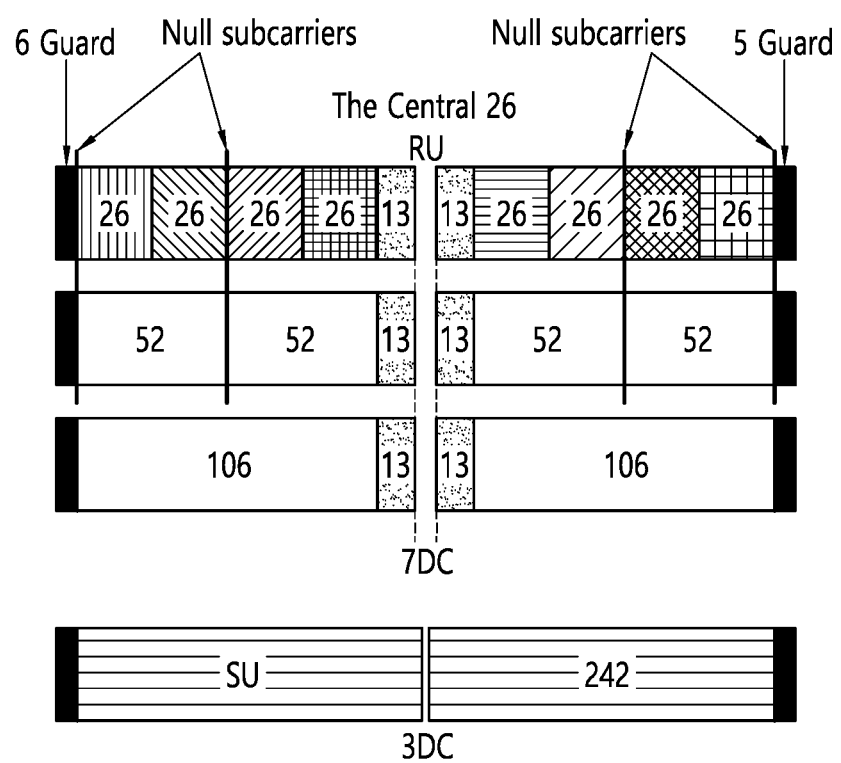
FIG. 4 is a diagram illustrating a layout of resource units (RUs) used in a band of 20 MHz.

FIG. 4 is a diagram illustrating a layout of resource units (RUs) used in a band of 20 MHz.

As illustrated in FIG. 4, resource units (RUs) corresponding to tone (that is, subcarriers) of different numbers are used to constitute some fields of the HE-PPDU. For example, the resources may be allocated by the unit of the RU illustrated for the HE-STF, the HE-LTF, and the data field.

As illustrated in an uppermost part of FIG. 4, 26 units (that is, units corresponding to 26 tones). 6 tones may be used as a guard band in a leftmost band of the 20 MHz band and 5 tones may be used as the guard band in a rightmost band of the 20 MHz band. Further, 7 DC tones may be inserted into a center band, that is, a DC band and a 26-unit corresponding to each 13 tones may be present at left and right sides of the DC band. The 26-unit, a 52-unit, and a 106-unit may be allocated to other bands. Each unit may be allocated for a receiving station, that is, a user.

Meanwhile, the RU layout of FIG. 4 may be used even in a situation for a single user (SU) in addition to the multiple users (MUs) and in this case, as illustrated in a lowermost part of FIG. 4, one 242-unit may be used and in this case, three DC tones may be inserted.

In one example of FIG. 4, RUs having various sizes, that is, a 26-RU, a 52-RU, a 106-RU, a 242-RU, and the like are proposed, and as a result, since detailed sizes of the RUs may extend or increase, the embodiment is not limited to a detailed size (that is, the number of corresponding tones) of each RU.

Figure 5:
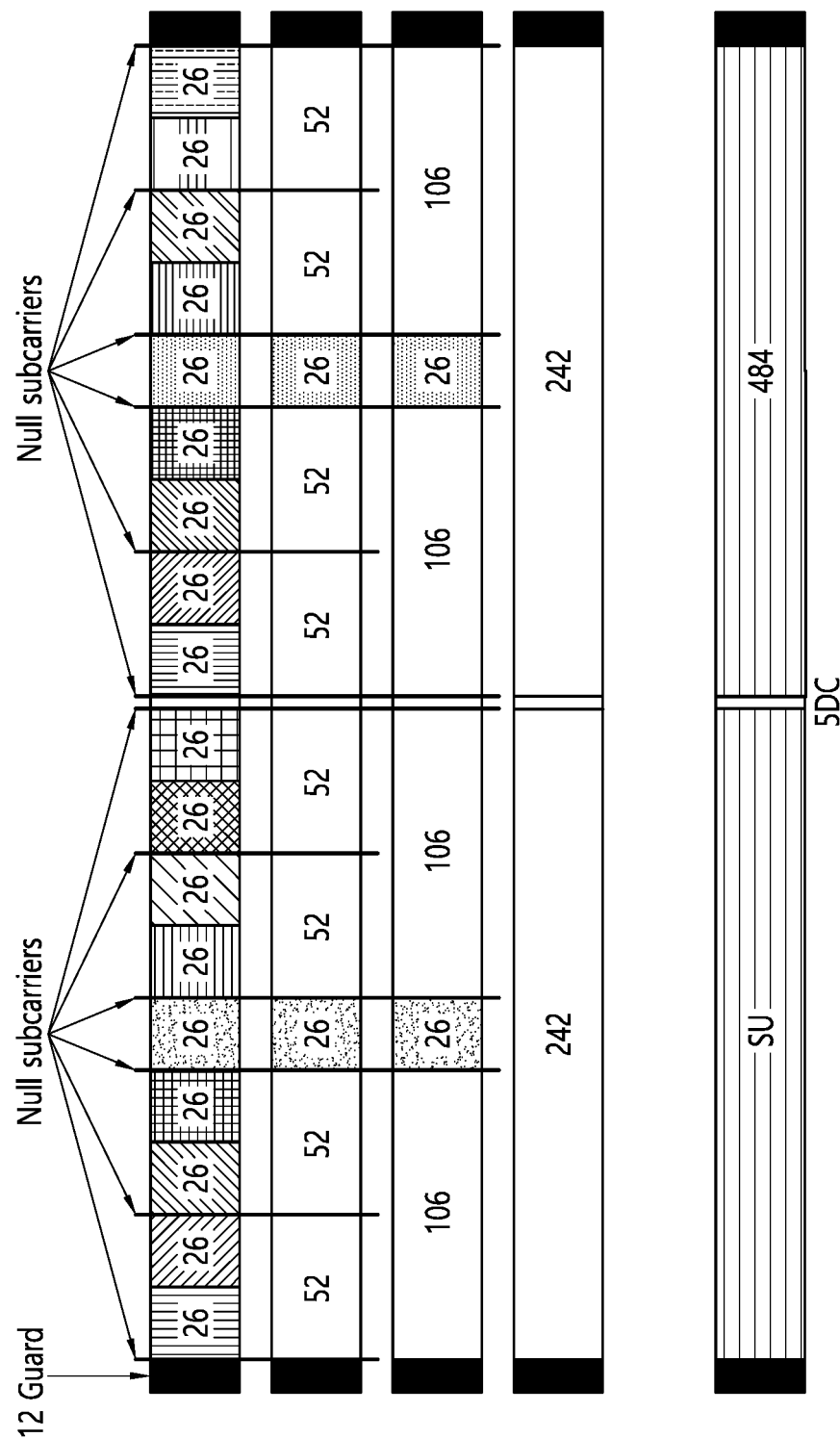
FIG. 5 is a diagram illustrating a layout of resource units (RUs) used in a band of 40 MHz.

FIG. 5 is a diagram illustrating a layout of resource units (RUs) used in a band of 40 MHz.

Similarly to a case in which the RUs having various RUs are used in one example of FIG. 4, 26-RU, 52-RU, 106-RU, 242-RU, 484-RU, and the like may be used even in one example of FIG. 5. Further, 5 DC tones may be inserted into a center frequency, 12 tones may be used as the guard band in the leftmost band of the 40 MHz band and 11 tones may be used as the guard band in the rightmost band of the 40 MHz band.

In addition, as illustrated in FIG. 5, when the RU layout is used for the single user, the 484-RU may be used. That is, the detailed number of RUs may be modified similarly to one example of FIG. 4.

Figure 6:
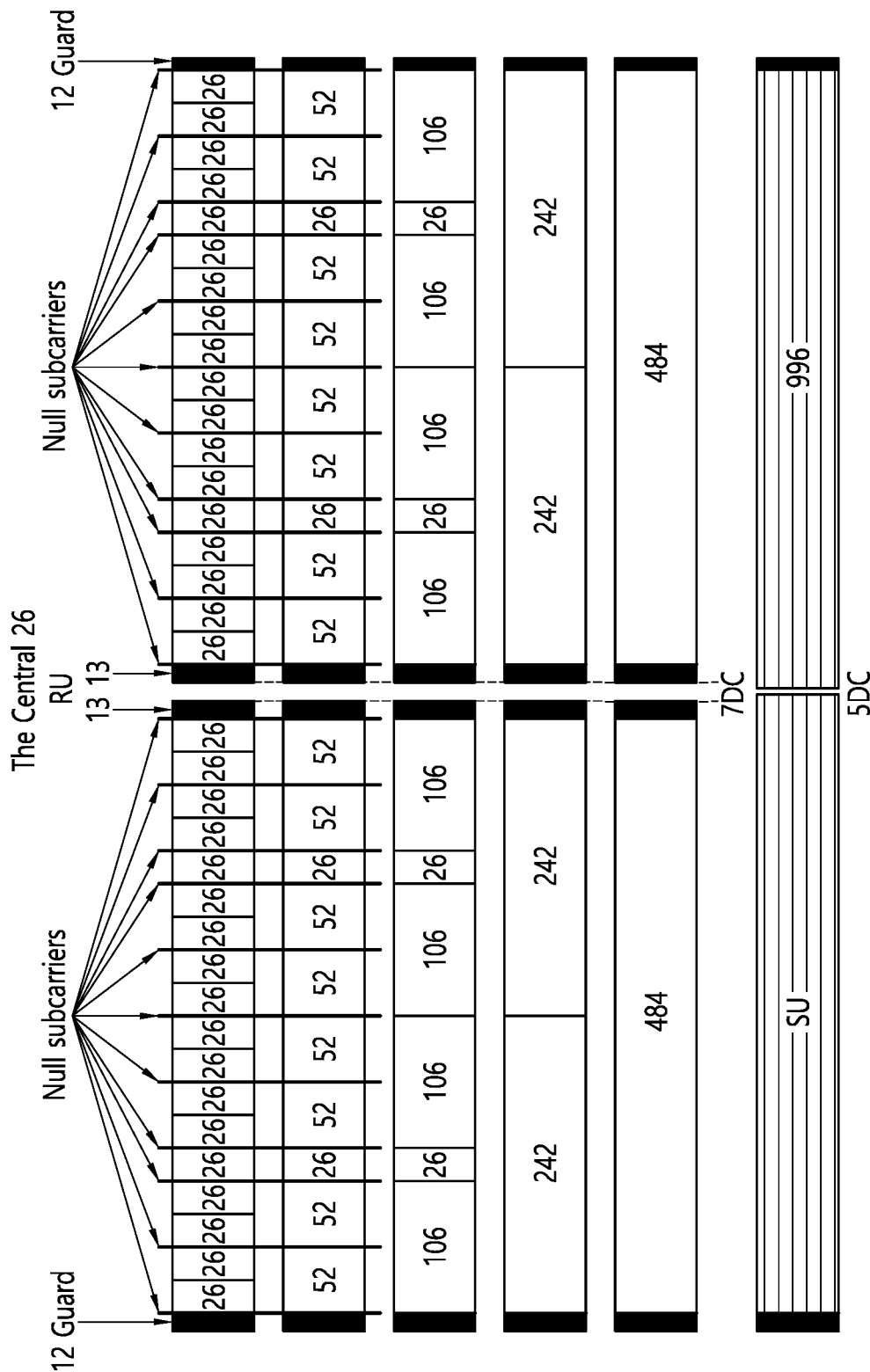
FIG. 6 is a diagram illustrating a layout of resource units (RUs) used in a band of 80 MHz.

FIG. 6 is a diagram illustrating a layout of resource units (RUs) used in a band of 80 MHz.

Similarly to a case in which the RUs having various RUs are used in one example of each of FIG. 4 or 5, 26-RU, 52-RU, 106-RU, 242-RU, 484-RU, and the like may be used even in one example of FIG. 6. Further, 7 DC tones may be inserted into the center frequency, 12 tones may be used as the guard band in the leftmost band of the 80 MHz band and 11 tones may be used as the guard band in the rightmost band of the 80 MHz band. In addition, the 26-RU may be used, which uses 13 tones positioned at each of left and right sides of the DC band.

Moreover, as illustrated in FIG. 6, when the RU layout is used for the single user, 996-RU may be used and in this case, 5 DC tones may be inserted.

Meanwhile, the detailed number of RUs may be modified similarly to one example of each of FIG. 4 or 5.

Figure 7:
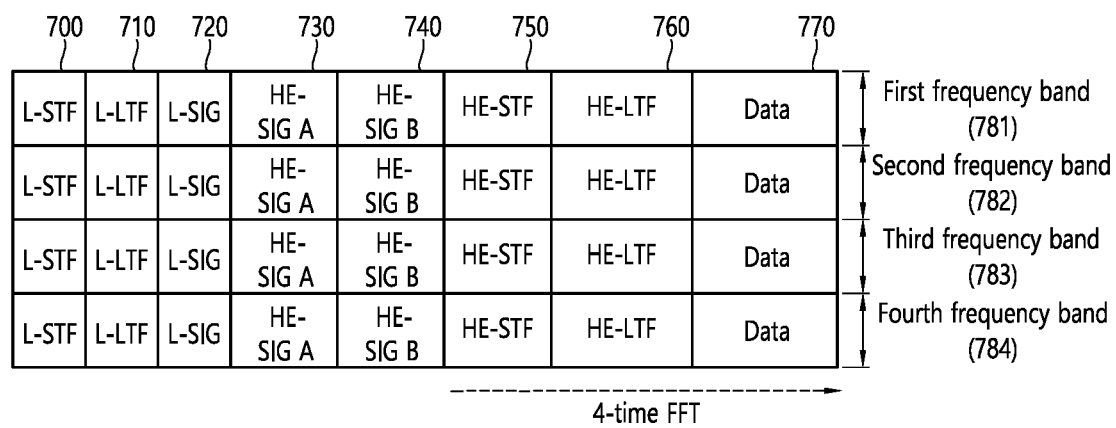
FIG. 7 is a diagram illustrating another example of the HE PPDU.

FIG. 7 is a diagram illustrating another example of the HE PPDU.

A block illustrated in FIG. 7 is another example of describing the HE-PPDU block of FIG. 3 in terms of a frequency.

An illustrated L-STF 700 may include a short training orthogonal frequency division multiplexing (OFDM) symbol. The L-STF 700 may be used for frame detection, automatic gain control (AGC), diversity detection, and coarse frequency/time synchronization.

An L-LTF 710 may include a long training orthogonal frequency division multiplexing (OFDM) symbol. The L-LTF 710 may be used for fine frequency/time synchronization and channel prediction.

An L-SIG 720 may be used for transmitting control information. The L-SIG 720 may include information regarding a data rate and a data length. Further, the L-SIG 720 may be repeatedly transmitted. That is, a new format, in which the L-SIG 720 is repeated (for example, may be referred to as R-LSIG) may be configured.

An HE-SIG-A 730 may include the control information common to the receiving station.

In detail, the HE-SIG-A 730 may include information on 1) a DL/UL indicator, 2) a BSS color field indicating an identify of a BSS, 3) a field indicating a remaining time of a current TXOP period, 4) a bandwidth field indicating at least one of 20, 40, 80, 160 and 80+80 MHz, 5) a field indicating an MCS technique applied to the HE-SIG-B, 6) an indication field regarding whether the HE-SIG-B is modulated by a dual subcarrier modulation technique for MCS, 7) a field indicating the number of symbols used for the HE-SIG-B, 8) a field indicating whether the HE-SIG-B is configured for a full bandwidth MIMO transmission, 9) a field indicating the number of symbols of the HE-LTF, 10) a field indicating the length of the HE-LTF and a CP length, 11) a field indicating whether an OFDM symbol is present for LDPC coding, 12) a field indicating control information regarding packet extension (PE), 13) a field indicating information on a CRC field of the HE-SIG-A, and the like. A detailed field of the HE-SIG-A may be added or partially omitted. Further, some fields of the HE-SIG-A may be partially added or omitted in other environments other than a multi-user (MU) environment.

In addition, the HE-SIG-A 730 may be composed of two parts: HE-SIG-A1 and HE-SIG-A2. HE-SIG-A1 and HE-SIG-A2 included in the HE-SIG-A may be defined by the following format structure (fields) according to the PPDU. First, the HE-SIG-A field of the HE SU PPDU may be defined as follows.

TABLE 1

| Two Parts of HE-SIG-A | Bit | Field | Number of bits | Description |
|---|---|---|---|---|
| HE-SIG-A1 | B0 | Format | 1 | Differentiate an HE SU PPDU and HE ER SU PPDU from an HE TB PPDU: Set to 1 for an HE SU PPDU and HE ER SU PPDU |
| | B1 | Beam Change | 1 | Set to 1 to indicate that the pre-HE modulated fields of the PPDU are spatially mapped differently from the first symbol of the HE-LTF. Equation (28-6), Equation (28-9), Equation (28-12), Equation (28-14), Equation (28-16) and Equation (28-18) apply if the Beam Change field is set to 1. Set to 0 to indicate that the pre-HE modulated fields of the PPDU are spatially mapped the same way as the first symbol of the HE-LTF on each tone. Equation (28-8), Equation (28-10), Equation (28-13), Equation (28-15), Equation (28-17) and Equation (28-19) apply if the Beam Change field is set to 0.(#16803) |
| | B2 | UL/DL | 1 | Indicates whether the PPDU is sent UL or DL. Set to the value indicated by the TXVECTOR parameter UPLINK_FLAG. |
| | B3-B6 | MCS | 4 | For an HE SU PPDU: Set to n for MCSn, where n = 0, 1, 2, . . . , 11 Values 12-15 are reserved For HE ER SU PPDU with Bandwidth field set to 0 (242-tone RU): Set to n for MCSn, where n = 0, 1, 2 Values 3-15 are reserved For HE ER SU PPDU with Bandwidth field set to 1 (upper frequency 106-tone RU): Set to 0 for MCS 0 Values 1-15 are reserved |
| | B7 | DCM | 1 | Indicates whether or not DCM is applied to the Data field for the MCS indicated. If the STBC field is 0, then set to 1 to indicate that DCM is applied to the Data field. Neither DCM nor STBC shall be applied if(#15489) both the DCM and STBC are set to 1. Set to 0 to indicate that DCM is not applied to the Data field. NOTE-DCM is applied only to HE-MCSs 0, 1, 3 and 4. DCM is applied only to 1 and 2 spatial streams. DCM is not applied in combination with STBC(#15490). |
| | B8-B13 | BSS Color | 6 | The BSS Color field is an identifier of the BSS. Set to the value of the TXVECTOR parameter BSS_COLOR. |
| | B14 | Reserved | 1 | Reserved and set to 1 |
| | B15-B18 | Spatial Reuse | 4 | Indicates whether or not spatial reuse is allowed during the transmission of this PPDU(#16804). Set to a value from Table 28-21 (Spatial Reuse field encoding for an HE SU PPDU, HE ER SU PPDU, and |

TABLE 1-continued

| Two Parts of HE-SIG-A | Bit | Field | Number of bits | Description |
|---|---|---|---|---|
| | | | | HE MU PPDU), see 27.11.6 (SPATIAL_REUSE). Set to SRP_DISALLOW to prohibit SRP-based spatial reuse during this PPDU. Set to SRP_AND_NON_S-RG_OBSS_PD_PROHIBITED to prohibit both SRP-based spatial reuse and non-SRG OBSS PD-based spatial reuse during this PPDU. For the interpretation of other values see 27.11.6 (SPATIAL_REUSE) and 27.9 (Spatial reuse operation). |
| | B19-B20 | Bandwidth | 2 | For an HE SU PPDU: Set to 0 for 20 MHz Set to 1 for 40 MHz Set to 2 for 80 MHz Set to 3 for 160 MHz and 80 + 80 MHz For an HE ER SU PPDU: Set to 0 for 242-tone RU Set to 1 for upper frequency 106-tone RU within the primary 20 MHz Values 2 and 3 are reserved |
| | B21-B22 | GI + LTF Size | 2 | Indicates the GI duration and HE-LTF size. Set to 0 to indicate a 1 × HE-LTF and 0.8 μs GI Set to 1 to indicate a 2 × HE-LTF and 0.8 μs GI Set to 2 to indicate a 2 × HE-LTF and 1.6 μs GI Set to 3 to indicate: a 4 × HE-LTF and 0.8 μs GI if both the DCM and STBC fields are 1. Neither DCM nor STBC shall be applied if(#Ed) both the DCM and STBC fields are set to 1. a 4 × HE-LTF and 3.2 μs GI, otherwise |
| | B23-B25 | NSTS And Midamble Periodicity | 3 | If the Doppler field is 0, indicates the number of space-time streams. Set to the number of space-time streams minus 1 For an HE ER SU PPDU, values 2 to 7 are reserved If the Doppler field is 1, then B23-B24 indicates the number of space time streams, up to 4, and B25 indicates the midamble periodicity. B23-B24 is set to the number of space time streams minus 1. For an HE ER SU PPDU, values 2 and 3 are reserved B25 is set to 0 if TXVECTOR parameter MIDAM-BLE_PERIODICITY is 10 and set to 1 if TXVECTOR parameter MIDAMBLE_PERIODICITY is 20. |
| HE-SIG-A2 (HE SU PPDU) or HE-SIG-A3 (HE ER SU PPDU) | B0-B6 | TXOP | 7 | Set to 127 to indicate no duration information if(#15491) TXVECTOR parameter TXOP_DURA-TION is set to UNSPECIFIED. Set to a value less than 127 to indicate duration information for NAV setting and protection of the TXOP as follows: If TXVECTOR parameter TXOP_DURATION is less than 512, then B0 is set to 0 and B1-B6 is set to floor(TXOP_DURATION/8)(#16277). Otherwise, B0 is set to 1 and B1-B6 is set to floor ((TXOP_DURATION-512)/128)(#16277). where(#16061) B0 indicates the TXOP length granularity. Set to 0 for 8 μs; otherwise set to 1 for 128 μs. B1-B6 indicates the scaled value of the TXOP_DU-RATION |
| | B7 | Coding | 1 | Indicates whether BCC or LDPC is used: Set to 0 to indicate BCC Set to 1 to indicate LDPC |
| | B8 | LDPC Extra Symbol Segment | 1 | Indicates the presence of the extra OFDM symbol segment for LDPC: Set to 1 if an extra OFDM symbol segment for LDPC is present Set to 0 if an extra OFDM symbol segment for LDPC is not present Reserved and set to 1 if the Coding field is set to 0(#15492). |
| | B9 | STBC | 1 | If the DCM field is set to 0, then set to 1 if space time block coding is used. Neither DCM nor STBC shall be applied if(#15493) both the DCM field and STBC field are set to 1. Set to 0 otherwise. |
| | B10 | Beam-formed (#16038) | 1 | Set to 1 if a beamforming steering matrix is applied to the waveform in an SU transmission. Set to 0 otherwise. |

TABLE 1-continued

| Two Parts of HE-SIG-A | Bit | Field | Number of bits | Description |
|---|---|---|---|---|
| | B11-B12 | Pre-FEC Padding Factor | 2 | Indicates the pre-FEC padding factor.<br>Set to 0 to indicate a pre-FEC padding factor of 4<br>Set to 1 to indicate a pre-FEC padding factor of 1<br>Set to 2 to indicate a pre-FEC padding factor of 2<br>Set to 3 to indicate a pre-FEC padding factor of 3 |
| | B13 | PE Disambiguity | 1 | Indicates PE disambiguity(#16274) as defined in 28.3.12 (Packet extension). |
| | B14 | Reserved | 1 | Reserved and set to 1 |
| | B15 | Doppler | 1 | Set to 1 if one of the following applies:<br>The number of OFDM symbols in the Data field is larger than the signaled midamble periodicity plus 1 and the midamble is present<br>The number of OFDM symbols in the Data field is less than or equal to the signaled midamble periodicity plus 1 (see 28.3.11.16 Midamble), the midamble is not present, but the channel is fast varying. It recommends that midamble may be used for the PPDUs of the reverse link.<br>Set to 0 otherwise. |
| | B16-B19 | CRC | 4 | CRC for bits 0-41 of the HE-SIG-A field (see 28.3.10.7.3 (CRC computation)). Bits 0-41 of the HE-SIG-A field correspond to bits 0-25 of HE-SIG-A1 followed by bits 0-15 of HE-SIG-A2). |
| | B20-B25 | Tail | 6 | Used to terminate the trellis of the convolutional decoder.<br>Set to 0. |

In addition, the HE-SIG-A field of the HE MU PPDU may be defined as follows.

TABLE 2

| Two Parts of HE-SIG-A | Bit | Field | Number of bits | Description |
|---|---|---|---|---|
| HE-SIG-A1 | B0 | UL/DL | 1 | Indicates whether the PPDU is sent UL or DL. Set to the value indicated by the TXVECTOR parameter UPLINK_FLAG.(#16805)<br>NOTE-The TDLS peer can identify the TDLS frame by To DS and From DS fields in the MAC header of the MPDU. |
| | B1-B3 | SIGB MCS | 3 | Indicates the MCS of the HE-SIG-B field:<br>Set to 0 for MCS 0<br>Set to 1 for MCS 1<br>Set to 2 for MCS 2<br>Set to 3 for MCS 3<br>Set to 4 for MCS 4<br>Set to 5 for MCS 5<br>The values 6 and 7 are reserved |
| | B4 | SIGB DCM | 1 | Set to 1 indicates that the HE-SIG-B is modulated with DCM for the MCS.<br>Set to 0 indicates that the HE-SIG-B is not modulated with DCM for the MCS.<br>NOTE-DCM is only applicable to MCS 0, MCS 1, MCS 3, and MCS 4. |
| | B5-B10 | BSS Color | 6 | The BSS Color field is an identifier of the BSS.<br>Set to the value of the TXVECTOR parameter BSS_COLOR. |
| | B11-B14 | Spatial Reuse | 4 | Indicates whether or not spatial reuse is allowed during the transmission of this PPDU(#16806).<br>Set to the value of the SPATIAL_REUSE parameter of the TXVECTOR, which contains a value from Table 28-21 (Spatial Reuse field encoding for an HE SU PPDU, HE ER SU PPDU, and HE MU PPDU) (see 27.11.6 (SPATIAL_REUSE)).<br>Set to SRP_DISALLOW to prohibit SRP-based spatial reuse during this PPDU. Set to SRP_AND_NON_SRG_OBSS_PD_PROHIBITED to prohibit both SRP-based spatial reuse and non-SRG OBSS PD-based spatial reuse during this PPDU. For the interpretation of other values see 27.11.6 (SPATIAL_REUSE) and 27.9 (Spatial reuse operation). |

TABLE 2-continued

| Two Parts of HE-SIG-A | Bit | Field | Number of bits | Description |
|---|---|---|---|---|
| | B15-B17 | Bandwidth | 3 | Set to 0 for 20 MHz.<br>Set to 1 for 40 MHz.<br>Set to 2 for 80 MHz non-preamble puncturing mode.<br>Set to 3 for 160 MHz and 80 + 80 MHz non-preamble puncturing mode.<br>If the SIGB Compression field is 0:<br>Set to 4 for preamble puncturing in 80 MHz, where in the preamble only the secondary 20 MHz is punctured.<br>Set to 5 for preamble puncturing in 80 MHz, where in the preamble only one of the two 20 MHz subchannels in secondary 40 MHz is punctured.<br>Set to 6 for preamble puncturing in 160 MHz or 80 + 80 MHz, where in the primary 80 MHz of the preamble only the secondary 20 MHz is punctured.<br>Set to 7 for preamble puncturing in 160 MHz or 80 + 80 MHz, where in the primary 80 MHz of the preamble the primary 40 MHz is present.<br>If the SIGB Compression field is 1 then values 4-7 are reserved. |
| | B18-B21 | Number Of HE-SIG-B Symbols Or MU-MIMO Users | 4 | If the HE-SIG-B Compression field is set to 0, indicates the number of OFDM symbols in the HE-SIG-B field:(#15494)<br>Set to the number of OFDM symbols in the HE-SIG-B field minus 1 if the number of OFDM symbols in the HE-SIG-B field is less than 16;<br>Set to 15 to indicate that the number of OFDM symbols in the HE-SIG-B field is equal to 16 if Longer Than 16 HE SIG-B OFDM Symbols Support subfield of the HE Capabilities element transmitted by at least one recipient STA is 0;<br>Set to 15 to indicate that the number of OFDM symbols in the HE-SIG-B field is greater than or equal to 16 if the Longer Than 16 HE SIG-B OFDM Symbols Support subfield of the HE Capabilities element transmitted by all the recipient STAs are 1 and if the HE-SIG-B data rate is less than MCS 4 without DCM. The exact number of OFDM symbols in the HE-SIG-B field is calculated based on the number of User fields in the HE-SIG-B content channel which is indicated by HE-SIG-B common field in this case.<br>If the HE-SIG-B Compression field is set to 1, indicates the number of MU-MIMO users and is set to the number of NU-MIMO users minus 1(#15495). |
| | B22 | SIGB Compression | 1 | Set to 0 if the Common field in HE-SIG-B is present.<br>Set to 1 if the Common field in HE-SIG-B is not present.(#16139) |
| | B23-B24 | GI + LTF Size | 2 | Indicates the GI duration and HE-LTF size:<br>Set to 0 to indicate a 4 × HE-LTF and 0.8 μs GI<br>Set to 1 to indicate a 2 × HE-LTF and 0.8 μs GI<br>Set to 2 to indicate a 2 × HE-LTF and 1.6 μs GI<br>Set to 3 to indicate a 4 × HE-LTF and 3.2 μs GI |
| | B25 | Doppler | 1 | Set to 1 if one of the following applies:<br>The number of OFDM symbols in the Data field is larger than the signaled midamble periodicity plus 1 and the midamble is present<br>The number of OFDM symbols in the Data field is less than or equal to the signaled midamble periodicity plus 1 (see 28.3.11.16 Midamble), the midamble is not present, but the channel is fast varying. It recommends that midamble may be used for the PPDUs of the reverse link.<br>Set to 0 otherwise. |
| HE-SIG-A2 | B0-B6 | TXOP | 7 | Set to 127 to indicate no duration information if(#15496) TXVECTOR parameter TXOP_DURATION is set to UNSPECIFIED.<br>Set to a value less than 127 to indicate duration information for NAV setting and protection of the TXOP as follows:<br>If TXVECTOR parameter TXOP_DURATION is less than 512, then B0 is set to 0 and B1-B6 is set to floor(TXOP_DURATION/8)(#16277). |

TABLE 2-continued

| Two Parts of HE-SIG-A | Bit | Field | Number of bits | Description |
|---|---|---|---|---|
| | | | | Otherwise, B0 is set to 1 and B1-B6 is set to floor ((TXOP_DURATION-512)/128)(#16277). where(#16061) B0 indicates the TXOP length granularity. Set to 0 for 8 μs; otherwise set to 1 for 128 μs. B1-B6 indicates the scaled value of the TXOP_DURATION |
| | B7 | Reserved | 1 | Reserved and set to 1 |
| | B8-B10 | Number of HE-LTF Symbols And Midamble Periodicity | 3 | If the Doppler field is set to 0(#15497), indicates the number of HE-LTF symbols: Set to 0 for 1 HE-LTF symbol Set to 1 for 2 HE-LTF symbols Set to 2 for 4 HE-LTF symbols Set to 3 for 6 HE-LTF symbols Set to 4 for 8 HE-LTF symbols Other values are reserved. If the Doppler field is set to 1(#15498), B8-B9 indicates the number of HE-LTF symbols(#16056) and B10 indicates midamble periodicity: B8-B9 is encoded as follows: 0 indicates 1 HE-LTF symbol 1 indicates 2 HE-LTF symbols 2 indicates 4 HE-LTF symbols 3 is reserved B10 is set to 0 if the TXVECTOR parameter MIDAMBLE_PERIODICITY is 10 and set to 1 if the TXVECTOR parameter PREAMBLE_PERIODICITY is 20. |
| | B11 | LDPC Extra Symbol Segment | 1 | Indication of the presence of the extra OFDM symbol segment for LDPC. Set to 1 if an extra OFDM symbol segment for LDPC is present. Set to 0 otherwise. |
| | B12 | STBC | 1 | In an HE MU PPDU where each RU includes no more than 1 user, set to 1 to indicate all RUs are STBC encoded in the payload, set to 0 to indicate all RUs are not STBC encoded in the payload. STBC does not apply to HE-SIG-B. STBC is not applied if one or more RUs are used for MU-MIMO allocation.(#15661) |
| | B13-B14 | Pre-FEC Padding Factor | 2 | Indicates the pre-FEC padding factor. Set to 0 to indicate a pre-FEC padding factor of 4 Set to 1 to indicate a pre-FEC padding factor of 1 Set to 2 to indicate a pre-FEC padding factor of 2 Set to 3 to indicate a pre-FEC padding factor of 3 |
| | B15 | PE Disambiguity | 1 | Indicates PE disambiguity(#16274) as defined in 28.3.12 (Packet extension). |
| | B16-B19 | CRC | 4 | CRC for bits 0-41 of the HE-SIG-A field (see 28.3.10.7.3 (CRC computation)). Bits 0-41 of the HE-SIG-A field correspond to bits 0-25 of HE-SIG-A1 followed by bits 0-15 of HE-SIG-A2). |
| | B20-B25 | Tail | 6 | Used to terminate the trellis of the convolutional decoder. Set to 0. |

In addition, the HE-SIG-A field of the HE TB PPDU may be defined as follows.

TABLE 3

| Two Parts of HE-SIG-A | Bit | Field | Number of bits | Description |
|---|---|---|---|---|
| HE-SIG-A1 | B0 | Format | 1 | Differentiate an HE SU PPDU and HE ER SU PPDU from an HE TB PPDU: Set to 0 for an HE TB PPDU |
| | B1-B6 | BSS Color | 6 | The BSS Color field is an identifier of the BSS. Set to the value of the TXVECTOR parameter BSS_COLOR. |
| | B7-B10 | Spatial Reuse 1 | 4 | Indicates whether or not spatial reuse is allowed in a subband of the PPDU during the transmission of this PPDU, and if allowed, indicates a value that is used to determine a limit on the transmit power of a spatial reuse transmission. |

TABLE 3-continued

| Two Parts of HE-SIG-A | Bit | Field | Number of bits | Description |
|---|---|---|---|---|
| | | | | If the Bandwidth field indicates 20 MHz, 40 MHZ, or 80 MHz then this Spatial Reuse field applies to the first 20 MHz subband. If the Bandwidth field indicates 160/80 + 80 MHz then this Spatial Reuse field applies to the first 40 MHz subband of the 160 MHz operating band. Set to the value of the SPATIAL_REUSE(1) parameter of the TXVECTOR, which contains a value from Table 28-22 (Spatial Reuse field encoding for an HE TB PPDU) for an HE TB PPDU (see 27.11.6 (SPATIAL_REUSE)). Set to SRP_DISALLOW to prohibit SRP-based spatial reuse during this PPDU. Set to SRP_AND_NON_S-RG_OBSS_PD_PROHIBITED to prohibit both SRP-based spatial reuse and non-SRG OBSS PD-based spatial reuse during this PPDU. For the interpretation of other values see 27.11.6 (SPATIAL_REUSE) and 27.9 (Spatial reuse operation). |
| | B11-B14 | Spatial Reuse 2 | 4 | Indicates whether or not spatial reuse is allowed in a subband of the PPDU during the transmission of this PPDU, and if allowed, indicates a value that is used to determine a limit on the transmit power of a spatial reuse transmission. If the Bandwidth field indicates 20 MHz, 40 MHz, or 80 MHz: This Spatial Reuse field applies to the second 20 MHz subband. If(#Ed) the STA operating channel width is 20 MHZ, then this field is set to the same value as Spatial Reuse 1 field. If(#Ed) the STA operating channel width is 40 MHz in the 2.4 GHz band, this field is set to the same value as Spatial Reuse 1 field. If the Bandwidth field indicates 160/80 + 80 MHz the this Spatial Reuse field applies to the second 40 MHz subband of the 160 MHz operating band. Set to the value of the SPATIAL_REUSE(2) parameter of the TXVECTOR, which contains a value from Table 28-22 (Spatial Reuse field encoding for an HE TB PPDU) for an HE TB PPDU (see 27.11.6 (SPATIAL_REUSE)). Set to SRP_DISALLOW to prohibit SRP-based spatial reuse during this PPDU. Set to SRP_AND_NON_S-RG_OBSS_PD_PROHIBITED to prohibit both SRP-based spatial reuse and non-SRG OBSS PD-based spatial reuse during this PPDU. For the interpretation of other values see 27.11.6 (SPATIAL_REUSE) and 27.9 (Spatial reuse operation). |
| | B15-B18 | Spatial Reuse 3 | 4 | Indicates whether or not spatial reuse is allowed in a subband of the PPDU during the transmission of this PPDU, and if allowed, indicates a value that is used to determine a limit on the transmit power of a spatial reuse transmission. If the Bandwidth field indicates 20 MHz, 40 MHz or 80 MHz: This Spatial Reuse field applies to the third 20 MHz subband. If(#Ed) the STA operating channel width is 20 MHz or 40 MHz, this field is set to the same value as Spatial Reuse 1 field. If the Bandwidth field indicates 160/80 + 80 MHz: This Spatial Reuse field applies to the third 40 MHz subband of the 160 MHz operating band. If(#Ed) the STA operating channel width is 80 + 80 MHz, this field is set to the same value as Spatial Reuse 1 field. Set to the value of the SPATIAL_REUSE(3) parameter of the TXVECTOR, which contains a value from Table 28-22 (Spatial Reuse field encoding for an HE TB PPDU) for an HE TB PPDU (see 27.11.6 (SPATIAL_REUSE)). |

TABLE 3-continued

| Two Parts of HE-SIG-A | Bit | Field | Number of bits | Description |
|---|---|---|---|---|
| | | | | Set to SRP_DISALLOW to prohibit SRP-based spatial reuse during this PPDU. Set to SRP_AND_NON_S-RG_OBSS_PD_PROHIBITED to prohibit both SRP-based spatial reuse and non-SRG OBSS PD-based spatial reuse during this PPDU. For the interpretation of other values see 27.11.6 (SPATIAL_REUSE) and 27.9 (Spatial reuse operation). |
| | B19-B22 | Spatial Reuse 4 | 4 | Indicates whether or not spatial reuse is allowed in a subband of the PPDU during the transmission of this PPDU, and if allowed, indicates a value that is used to determine a limit on the transmit power of a spatial reuse transmission.<br>If the Bandwidth field indicates 20 MHz, 40 MHz or 80 MHz:<br>This Spatial Reuse field applies to the fourth 20 MHz subband.<br>If(#Ed) the STA operating channel width is 20 MHZ, then this field is set to the same value as Spatial Reuse 1 field.<br>If(#Ed) the STA operating channel width is 40 MHz, then this field is set to the same value as Spatial Reuse 2 field.<br>If the Bandwidth field indicates 160/80 + 80 MHz:<br>This Spatial Reuse field applies to the fourth 40 MHz subband of the 160 MHz operating band.<br>If(#Ed) the STA operating channel width is 80 + 80 MHz, then this field is set to same value as Spatial Reuse 2 field.<br>Set to the value of the SPATIAL_REUSE(4) parameter of the TXVECTOR, which contains a value from Table 28-22 (Spatial Reuse field encoding for an HE TB PPDU) for an HE TB PPDU (see 27.11.6 (SPATIAL_REUSE)).<br>Set to SRP_DISALLOW to prohibit SRP-based spatial reuse during this PPDU. Set to SRP_AND_NON_S-RG_OBSS_PD_PROHIBITED to prohibit both SRP-based spatial reuse and non-SRG OBSS PD-based spatial reuse during this PPDU. For the interpretation of other values see 27.11.6 (SPATIAL_REUSE) and 27.9 (Spatial reuse operation). |
| | B23 | Reserved | 1 | Reserved and set to 1.<br>NOTE-Unlike other Reserved fields in HE-SIG-A of the HE TB PPDU, B23 does not have a corresponding bit in the Trigger frame. |
| | B24-B25 | Bandwidth | 2 | (#16003)Set to 0 for 20 MHz<br>Set to 1 for 40 MHz<br>Set to 2 for 80 MHz<br>Set to 3 for 160 MHz and 80 + 80 MHz |
| HE-SIG-A2 | B0-B6 | TXOP | 7 | Set to 127 to indicate no duration information if(#15499) TXVECTOR parameter TXOP_DURATION is set to UNSPECIFIED.<br>Set to a value less than 127 to indicate duration information for NAV setting and protection of the TXOP as follows:<br>If TXVECTOR parameter TXOP_DURATION is less than 512, then B0 is set to 0 and B1-B6 is set to floor(TXOP_DURATION/8)(#16277).<br>Otherwise, B0 is set to 1 and B1-B6 is set to floor((TXOP_DURATION−512)/ 128)(#16277).<br>where(#16061)<br>B0 indicates the TXOP length granularity. Set to 0 for 8 μs; otherwise set to 1 for 128 μs.<br>B1-B6 indicates the scaled value of the TXOP_DURATION |
| | B7-B15 | Reserved | 9 | Reserved and set to value indicated in the UL HE-SIG-A2 Reserved subfield in the Trigger frame. |
| | B16-B19 | CRC | 4 | CRC of bits 0-41 of the HE-SIG-A field. See 28.3.10.7.3 (CRC computation). Bits 0-41 of the HE-SIG-A field correspond to bits 0-25 of HE-SIG-A1 followed by bits 0-15 of HE-SIG-A2). |
| | B20-B25 | Tail | 6 | Used to terminate the trellis of the convolutional decoder.<br>Set to 0. |

An HE-SIG-B 740 may be included only in the case of the PPDU for the multiple users (MUs) as described above. Principally, an HE-SIG-A 750 or an HE-SIG-B 760 may include resource allocation information (alternatively, virtual resource allocation information) for at least one receiving STA.

Figure 8:
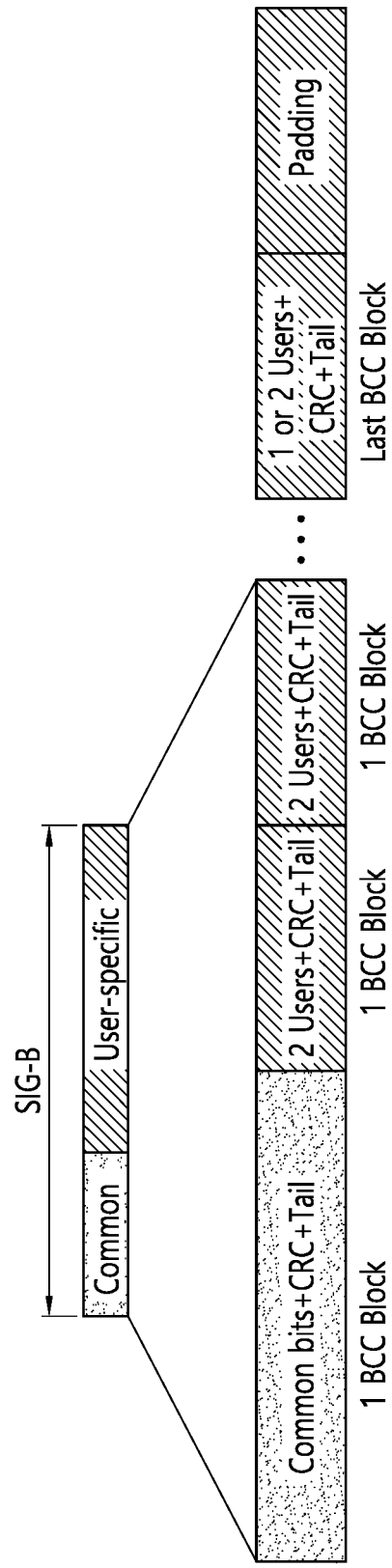
FIG. 8 is a block diagram illustrating one example of HE-SIG-B according to an embodiment.

FIG. 8 is a block diagram illustrating one example of HE-SIG-B according to an embodiment.

As illustrated in FIG. 8, the HE-SIG-B field includes a common field at a frontmost part and the corresponding common field is separated from a field which follows therebehind to be encoded. That is, as illustrated in FIG. 8, the HE-SIG-B field may include a common field including the common control information and a user-specific field including user-specific control information. In this case, the common field may include a CRC field corresponding to the common field, and the like and may be coded to be one BCC block. The user-specific field subsequent thereafter may be coded to be one BCC block including the "user-specific field" for 2 users and a CRC field corresponding thereto as illustrated in FIG. 8.

A previous field of the HE-SIG-B 740 may be transmitted in a duplicated form on an MU PPDU. In the case of the HE-SIG-B 740, the HE-SIG-B 740 transmitted in some frequency band (e.g., a fourth frequency band) may even include control information for a data field corresponding to a corresponding frequency band (that is, the fourth frequency band) and a data field of another frequency band (e.g., a second frequency band) other than the corresponding frequency band. Further, a format may be provided, in which the HE-SIG-B 740 in a specific frequency band (e.g., the second frequency band) is duplicated with the HE-SIG-B 740 of another frequency band (e.g., the fourth frequency band). Alternatively, the HE-SIG B 740 may be transmitted in an encoded form on all transmission resources. A field after the HE-SIG B 740 may include individual information for respective receiving STAs receiving the PPDU.

The HE-STF 750 may be used for improving automatic gain control estimation in a multiple input multiple output (MIMO) environment or an OFDMA environment.

The HE-LTF 760 may be used for estimating a channel in the MIMO environment or the OFDMA environment.

The size of fast Fourier transform (FFT)/inverse fast Fourier transform (IFFT) applied to the HE-STF 750 and the field after the HE-STF 750, and the size of the FFT/IFFT applied to the field before the HE-STF 750 may be different from each other. For example, the size of the FFT/IFFT applied to the HE-STF 750 and the field after the HE-STF 750 may be four times larger than the size of the FFT/IFFT applied to the field before the HE-STF 750.

For example, when at least one field of the L-STF 700, the L-LTF 710, the L-SIG 720, the HE-SIG-A 730, and the HE-SIG-B 740 on the PPDU of FIG. 7 is referred to as a first field, at least one of the data field 770, the HE-STF 750, and the HE-LTF 760 may be referred to as a second field. The first field may include a field associated with a legacy system and the second field may include a field associated with an HE system. In this case, the fast Fourier transform (FFT) size and the inverse fast Fourier transform (IFFT) size may be defined as a size which is N (N is a natural number, e.g., N=1, 2, and 4) times larger than the FFT/IFFT size used in the legacy wireless LAN system. That is, the FFT/IFFT having the size may be applied, which is N (=4) times larger than the first field of the HE PPDU. For example, 256 FFT/IFFT may be applied to a bandwidth of 20 MHz, 512 FFT/IFFT may be applied to a bandwidth of 40 MHz, 1024 FFT/IFFT may be applied to a bandwidth of 80 MHz, and 2048 FFT/IFFT may be applied to a bandwidth of continuous 160 MHz or discontinuous 160 MHz.

In other words, a subcarrier space/subcarrier spacing may have a size which is 1/N times (N is the natural number, e.g., N=4, the subcarrier spacing is set to 78.125 kHz) the subcarrier space used in the legacy wireless LAN system. That is, subcarrier spacing having a size of 312.5 kHz, which is legacy subcarrier spacing may be applied to the first field of the HE PPDU and a subcarrier space having a size of 78.125 kHz may be applied to the second field of the HE PPDU.

Alternatively, an IDFT/DFT period applied to each symbol of the first field may be expressed to be N (=4) times shorter than the IDFT/DFT period applied to each data symbol of the second field. That is, the IDFT/DFT length applied to each symbol of the first field of the HE PPDU may be expressed as 3.2 μs and the IDFT/DFT length applied to each symbol of the second field of the HE PPDU may be expressed as 3.2 μs*4 (=12.8 μs). The length of the OFDM symbol may be a value acquired by adding the length of a guard interval (GI) to the IDFT/DFT length. The length of the GI may have various values such as 0.4 μs, 0.8 μs, 1.6 μs, 2.4 μs, and 3.2 μs.

For simplicity in the description, in FIG. 7, it is expressed that a frequency band used by the first field and a frequency band used by the second field accurately coincide with each other, but both frequency bands may not completely coincide with each other, in actual. For example, a primary band of the first field (L-STF, L-LTF, L-SIG, HE-SIG-A, and HE-SIG-B) corresponding to the first frequency band may be the same as the most portions of a frequency band of the second field (HE-STF, HE-LTF, and Data), but boundary surfaces of the respective frequency bands may not coincide with each other. As illustrated in FIGS. 4 to 6, since multiple null subcarriers, DC tones, guard tones, and the like are inserted during arranging the RUs, it may be difficult to accurately adjust the boundary surfaces.

The user (e.g., a receiving station) may receive the HE-SIG-A 730 and may be instructed to receive the downlink PPDU based on the HE-SIG-A 730. In this case, the STA may perform decoding based on the FFT size changed from the HE-STF 750 and the field after the HE-STF 750. On the contrary, when the STA may not be instructed to receive the downlink PPDU based on the HE-SIG-A 730, the STA may stop the decoding and configure a network allocation vector (NAV). A cyclic prefix (CP) of the HE-STF 750 may have a larger size than the CP of another field and the during the CP period, the STA may perform the decoding for the downlink PPDU by changing the FFT size.

Hereinafter, in the embodiment of the present disclosure, data (alternatively, or a frame) which the AP transmits to the STA may be expressed as a terms called downlink data (alternatively, a downlink frame) and data (alternatively, a frame) which the STA transmits to the AP may be expressed as a term called uplink data (alternatively, an uplink frame). Further, transmission from the AP to the STA may be expressed as downlink transmission and transmission from the STA to the AP may be expressed as a term called uplink transmission. In addition, a PHY protocol data unit (PPDU), a frame, and data transmitted through the downlink transmission may be expressed as terms such as a downlink PPDU, a downlink frame, and downlink data, respectively. The PPDU may be a data unit including a PPDU header and a physical layer service data unit (PSDU) (alternatively, a MAC protocol data unit (MPDU)). The PPDU header may include a PHY header and a PHY preamble and the PSDU (alternatively, MPDU) may include the frame or indicate the frame (alternatively, an information unit of the MAC layer) or be a data unit indicating the frame. The PHY header may be expressed as a physical layer convergence protocol (PLCP) header as another term and the PHY preamble may be expressed as a PLCP preamble as another term.

Further, a PPDU, a frame, and data transmitted through the uplink transmission may be expressed as terms such as an uplink PPDU, an uplink frame, and uplink data, respectively.

In the wireless LAN system to which the embodiment of the present description is applied, the total bandwidth may be used for downlink transmission to one STA and uplink transmission to one STA. Further, in the wireless LAN system to which the embodiment of the present description is applied, the AP may perform downlink (DL) multi-user (MU) transmission based on multiple input multiple output (MU MIMO) and the transmission may be expressed as a term called DL MU MIMO transmission.

In addition, in the wireless LAN system according to the embodiment, an orthogonal frequency division multiple access (OFDMA) based transmission method is preferably supported for the uplink transmission and/or downlink transmission. That is, data units (e.g., RUs) corresponding to different frequency resources are allocated to the user to perform uplink/downlink communication. In detail, in the wireless LAN system according to the embodiment, the AP may perform the DL MU transmission based on the OFDMA and the transmission may be expressed as a term called DL MU OFDMA transmission. When the DL MU OFDMA transmission is performed, the AP may transmit the downlink data (alternatively, the downlink frame and the downlink PPDU) to the plurality of respective STAs through the plurality of respective frequency resources on an overlapped time resource. The plurality of frequency resources may be a plurality of subbands (alternatively, sub channels) or a plurality of resource units (RUs). The DL MU OFDMA transmission may be used together with the DL MU MIMO transmission. For example, the DL MU MIMO transmission based on a plurality of space-time streams (alternatively, spatial streams) may be performed on a specific subband (alternatively, sub channel) allocated for the DL MU OFDMA transmission.

Further, in the wireless LAN system according to the embodiment, uplink multi-user (UL MU) transmission in which the plurality of STAs transmits data to the AP on the same time resource may be supported. Uplink transmission on the overlapped time resource by the plurality of respective STAs may be performed on a frequency domain or a spatial domain.

When the uplink transmission by the plurality of respective STAs is performed on the frequency domain, different frequency resources may be allocated to the plurality of respective STAs as uplink transmission resources based on the OFDMA. The different frequency resources may be different subbands (alternatively, sub channels) or different resources units (RUs). The plurality of respective STAs may transmit uplink data to the AP through different frequency resources. The transmission method through the different frequency resources may be expressed as a term called a UL MU OFDMA transmission method.

When the uplink transmission by the plurality of respective STAs is performed on the spatial domain, different time-space streams (alternatively, spatial streams) may be allocated to the plurality of respective STAs and the plurality of respective STAs may transmit the uplink data to the AP through the different time-space streams. The transmission method through the different spatial streams may be expressed as a term called a UL MU MIMO transmission method.

The UL MU OFDMA transmission and the UL MU MIMO transmission may be used together with each other. For example, the UL MU MIMO transmission based on the plurality of space-time streams (alternatively, spatial streams) may be performed on a specific subband (alternatively, sub channel) allocated for the UL MU OFDMA transmission.

In the legacy wireless LAN system which does not support the MU OFDMA transmission, a multi-channel allocation method is used for allocating a wider bandwidth (e.g., a 20 MHz excess bandwidth) to one terminal. When a channel unit is 20 MHz, multiple channels may include a plurality of 20 MHz-channels. In the multi-channel allocation method, a primary channel rule is used to allocate the wider bandwidth to the terminal. When the primary channel rule is used, there is a limit for allocating the wider bandwidth to the terminal. In detail, according to the primary channel rule, when a secondary channel adjacent to a primary channel is used in an overlapped BSS (OBSS) and is thus busy, the STA may use remaining channels other than the primary channel. Therefore, since the STA may transmit the frame only to the primary channel, the STA receives a limit for transmission of the frame through the multiple channels. That is, in the legacy wireless LAN system, the primary channel rule used for allocating the multiple channels may be a large limit in obtaining a high throughput by operating the wider bandwidth in a current wireless LAN environment in which the OBSS is not small.

In order to solve the problem, in the embodiment, a wireless LAN system is disclosed, which supports the OFDMA technology. That is, the OFDMA technique may be applied to at least one of downlink and uplink. Further, the MU-MIMO technique may be additionally applied to at least one of downlink and uplink. When the OFDMA technique is used, the multiple channels may be simultaneously used by not one terminal but multiple terminals without the limit by the primary channel rule. Therefore, the wider bandwidth may be operated to improve efficiency of operating a wireless resource.

As described above, in case the uplink transmission performed by each of the multiple STAs (e.g., non-AP STAs) is performed within the frequency domain, the AP may allocate different frequency resources respective to each of the multiple STAs as uplink transmission resources based on OFDMA. Additionally, as described above, the frequency resources each being different from one another may correspond to different subbands (or sub-channels) or different resource units (RUs).

The different frequency resources respective to each of the multiple STAs are indicated through a trigger frame.

Figure 9:
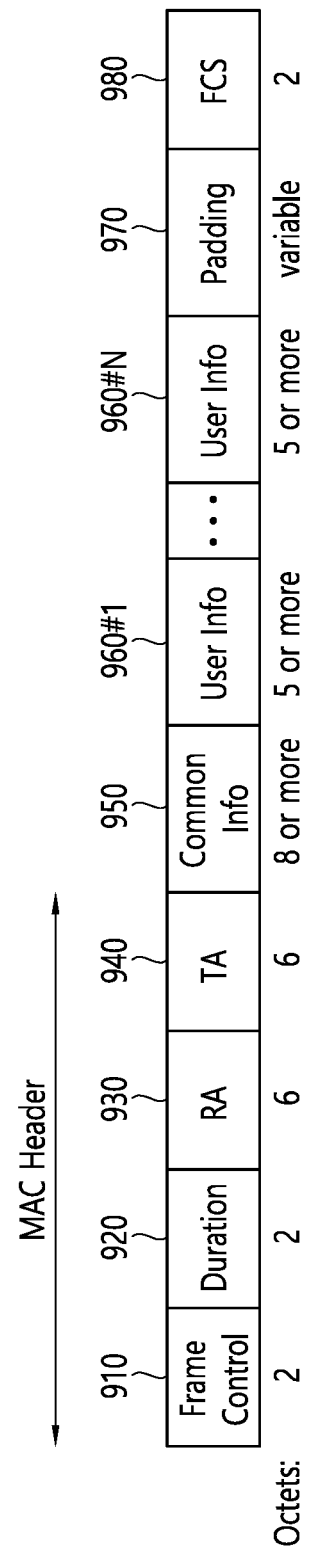
FIG. 9 illustrates an example of a trigger frame.

FIG. 9 illustrates an example of a trigger frame. The trigger frame of FIG. 9 allocates resources for Uplink Multiple-User (MU) transmission and may be transmitted from the AP. The trigger frame may be configured as a MAC frame and may be included in the PPDU. For example, the trigger frame may be transmitted through the PPDU shown in FIG. 3, through the legacy PPDU shown in FIG. 2, or through a certain PPDU, which is newly designed for the corresponding trigger frame. In case the trigger frame is transmitted through the PPDU of FIG. 3, the trigger frame may be included in the data field shown in the drawing.

Each of the fields shown in FIG. 9 may be partially omitted, or other fields may be added. Moreover, the length of each field may be varied differently as shown in the drawing.

A Frame Control field 910 shown in FIG. 9 may include information related to a version of the MAC protocol and other additional control information, and a Duration field 920 may include time information for configuring a NAV or information related to an identifier (e.g., AID) of the user equipment.

Also, the RA field 930 includes address information of a receiving STA of the corresponding trigger frame and may be omitted if necessary. The TA field 940 includes address information of an STA triggering the corresponding trigger frame (for example, an AP), and the common information field 950 includes common control information applied to a receiving STA that receives the corresponding trigger frame. For example, a field indicating the length of the L-SIG field of the UL PPDU transmitted in response to the corresponding trigger frame or information controlling the content of the SIG-A field (namely, the HE-SIG-A field) of the UL PPDU transmitted in response to the corresponding trigger frame may be included. Also, as common control information, information on the length of the CP of the UP PPDU transmitted in response to the corresponding trigger frame or information on the length of the LTF field may be included.

Also, it is preferable to include a per user information field (960 #1 to 960 #N) corresponding to the number of receiving STAs that receive the trigger frame of FIG. 9. The per user information field may be referred to as an "RU allocation field".

Also, the trigger frame of FIG. 9 may include a padding field 970 and a frame check sequence field 980.

It is preferable that each of the per user information fields (960 #1 to 960 #N) shown in FIG. 9 includes a plurality of subfields.

Figure 10:
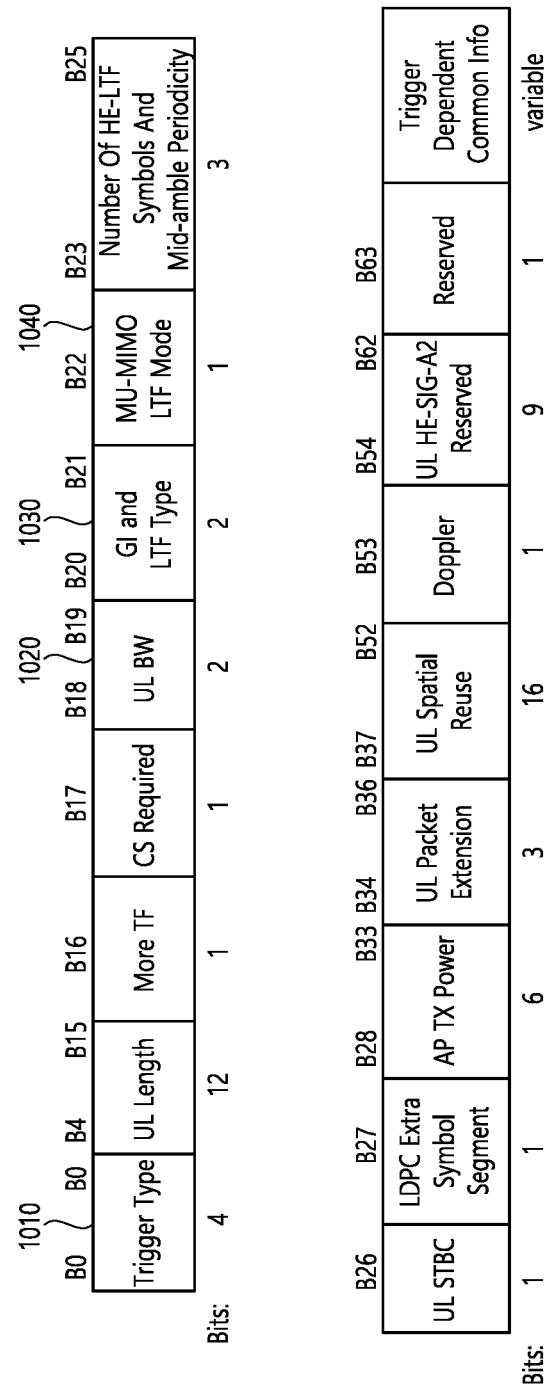
FIG. 10 illustrates an example of a common information field.

FIG. 10 illustrates an example of a common information field. Among the sub-fields of FIG. 10, some may be omitted, and other additional sub-fields may also be added. Additionally, the length of each of the sub-fields shown in the drawing may be varied.

The trigger type field 1010 of FIG. 10 may indicate a trigger frame variant and encoding of the trigger frame variant. The trigger type field 1010 may be defined as follows.

TABLE 4

| Trigger Type subfield value | Trigger frame variant |
|---|---|
| 0 | Basic |
| 1 | Beamforming Report Poll (BFRP) |
| 2 | MU-BAR |
| 3 | MU-RTS |
| 4 | Buffer Status Report Poll (BSRP) |
| 5 | GCR MU-BAR |
| 6 | Bandwidth Query Report Poll (BQRP) |
| 7 | NDP Feedback Report Poll (NFRP) |
| 8-15 | Reserved |

The UL BW field 1020 of FIG. 10 indicates bandwidth in the HE-SIG-A field of an HE Trigger Based (TB) PPDU. The UL BW field 1020 may be defined as follows.

TABLE 5

| UL BW subfield value | Description |
|---|---|
| 0 | 20 MHz |
| 1 | 40 MHz |
| 2 | 80 MHz |
| 3 | 80 + 80 MHz or 160 MHz |

The Guard Interval (GI) and LTF type fields 1030 of FIG. 10 indicate the GI and HE-LTF type of the HE TB PPDU response. The GI and LTF type field 1030 may be defined as follows.

TABLE 6

| GI And LTF field value | Description |
|---|---|
| 0 | 1 × HE-LTF + 1.6 μs GI |
| 1 | 2 × HE-LTF + 1.6 μs GI |
| 2 | 4 × HE- LTF + 3.2 μs GI(#15968) |
| 3 | Reserved |

Also, when the GI and LTF type fields 1030 have a value of 2 or 3, the MU-MIMO LTF mode field 1040 of FIG. 10 indicates the LTF mode of a UL MU-MIMO HE TB PPDU response. At this time, the MU-MIMO LTF mode field 1040 may be defined as follows.

If the trigger frame allocates an RU that occupies the whole HE TB PPDU bandwidth and the RU is allocated to one or more STAs, the MU-MIMO LTF mode field 1040 indicates one of an HE single stream pilot HE-LTF mode or an HE masked HE-LTF sequence mode.

If the trigger frame does not allocate an RU that occupies the whole HE TB PPDU bandwidth and the RU is not allocated to one or more STAs, the MU-MIMO LTF mode field 1040 indicates the HE single stream pilot HE-LTF mode. The MU-MIMO LTF mode field 1040 may be defined as follows.

TABLE 7

| MU-MIMO LTF subfield value | Description |
|---|---|
| 0 | HE single stream pilot HE-LTF mode |
| 1 | HE masked HE-LTF sequence mode |

Figure 11:
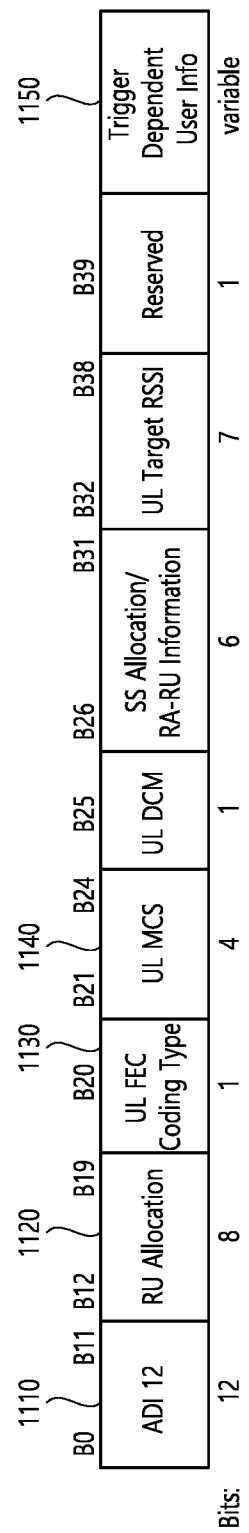
FIG. 11 illustrates an example of a sub-field being included in a per user information field.

FIG. 11 illustrates an example of a sub-field being included in a per user information field. Among the sub-fields of FIG. 11, some may be omitted, and other additional sub-fields may also be added. Additionally, the length of each of the sub-fields shown in the drawing may be varied.

The User Identifier field of FIG. 11 (or AID12 field, 1110) indicates the identifier of an STA (namely, a receiving STA) corresponding to per user information, where an example of the identifier may be the whole or part of the AID.

Also, an RU Allocation field 1120 may be included. In other words, when a receiving STA identified by the User Identifier field 1110 transmits a UL PPDU in response to the trigger frame of FIG. 9, the corresponding UL PPDU is transmitted through an RU indicated by the RU Allocation field 1120. In this case, it is preferable that the RU indicated by the RU Allocation field 1120 corresponds to the RUs shown in FIGS. 4, 5, and 6. A specific structure of the RU Allocation field 1120 will be described later.

The subfield of FIG. 11 may include a (UL FEC) coding type field 1130. The coding type field 1130 may indicate the coding type of an uplink PPDU transmitted in response to the trigger frame of FIG. 9. For example, when BCC coding is applied to the uplink PPDU, the coding type field 1130 may be set to '1', and when LDPC coding is applied, the coding type field 1130 may be set to '0'.

Additionally, the sub-field of FIG. 11 may include a UL MCS field 1140. The MCS field 1140 may indicate a MCS scheme being applied to the uplink PPDU that is transmitted in response to the trigger frame of FIG. 9.

Also, the subfield of FIG. 11 may include a Trigger Dependent User Info field 1150. When the Trigger Type field 1010 of FIG. 10 indicates a basic trigger variant, the Trigger Dependent User Info field 1150 may include an MPDU MU Spacing Factor subfield (2 bits), a TID Aggregate Limit subfield (3 bits), a Reserved field (1 bit), and a Preferred AC subfield (2 bits).

Hereinafter, the present disclosure proposes an example of improving a control field included in a PPDU. The control field improved according to the present disclosure includes a first control field including control information required to interpret the PPDU and a second control field including control information for demodulate the data field of the PPDU. The first and second control fields may be used for various fields. For example, the first control field may be the HE-SIG-A 730 of FIG. 7, and the second control field may be the HE-SIG-B 740 shown in FIGS. 7 and 8.

Hereinafter, a specific example of improving the first or the second control field will be described.

In the following example, a control identifier inserted to the first control field or a second control field is proposed. The size of the control identifier may vary, which, for example, may be implemented with 1-bit information.

The control identifier (for example, a 1-bit identifier) may indicate whether a 242-type RU is allocated when, for example, 20 MHz transmission is performed. As shown in FIGS. 4 to 6, RUs of various sizes may be used. These RUs may be divided broadly into two types. For example, all of the RUs shown in FIGS. 4 to 6 may be classified into 26-type RUs and 242-type RUs. For example, a 26-type RU may include a 26-RU, a 52-RU, and a 106-RU while a 242-type RU may include a 242-RU, a 484-RU, and a larger RU.

The control identifier (for example, a 1-bit identifier) may indicate that a 242-type RU has been used. In other words, the control identifier may indicate that a 242-RU, a 484-RU, or a 996-RU is included. If the transmission frequency band in which a PPDU is transmitted has a bandwidth of 20 MHz, a 242-RU is a single RU corresponding to the full bandwidth of the transmission frequency band (namely, 20 MHz). Accordingly, the control identifier (for example, 1-bit identifier) may indicate whether a single RU corresponding to the full bandwidth of the transmission frequency band is allocated.

For example, if the transmission frequency band has a bandwidth of 40 MHz, the control identifier (for example, a 1-bit identifier) may indicate whether a single RU corresponding to the full bandwidth (namely, bandwidth of 40 MHz) of the transmission frequency band has been allocated. In other words, the control identifier may indicate whether a 484-RU has been allocated for transmission in the frequency band with a bandwidth of 40 MHz.

For example, if the transmission frequency band has a bandwidth of 80 MHz, the control identifier (for example, a 1-bit identifier) may indicate whether a single RU corresponding to the full bandwidth (namely, bandwidth of 80 MHz) of the transmission frequency band has been allocated. In other words, the control identifier may indicate whether a 996-RU has been allocated for transmission in the frequency band with a bandwidth of 80 MHz.

Various technical effects may be achieved through the control identifier (for example, 1-bit identifier).

First of all, when a single RU corresponding to the full bandwidth of the transmission frequency band is allocated through the control identifier (for example, a 1-bit identifier), allocation information of the RU may be omitted. In other words, since only one RU rather than a plurality of RUs is allocated over the whole transmission frequency band, allocation information of the RU may be omitted deliberately.

Also, the control identifier may be used as signaling for full bandwidth MU-MIMO. For example, when a single RU is allocated over the full bandwidth of the transmission frequency band, multiple users may be allocated to the corresponding single RU. In other words, even though signals for each user are not distinctive in the temporal and spatial domains, other techniques (for example, spatial multiplexing) may be used to multiplex the signals for multiple users in the same, single RU. Accordingly, the control identifier (for example, a 1-bit identifier) may also be used to indicate whether to use the full bandwidth MU-MIMO described above.

The common field included in the second control field (HE-SIG-B, 740) may include an RU allocation subfield. According to the PPDU bandwidth, the common field may include a plurality of RU allocation subfields (including N RU allocation subfields). The format of the common field may be defined as follows.

TABLE 8

| Subfield | Number of bits | Description |
| --- | --- | --- |
| RU Allocation | N × 8 | Indicates the RU assignment to be used in the data portion in the frequency domain. It also indicates the number of users in each RU. For RUs of size greater than or equal to 106-tones that support MU-MIMO, it indicates the number of users multiplexed using MU-MIMO. Consists of N RU Allocation subfields: N = 1 for a 20 MHz and a 40 MHz HE MU PPDU N = 2 for an 80 MHz HE MU PPDU N = 4 for a 160 MHz or 80 + 80 MHz HE MU PPDU |

TABLE 8-continued

| Subfield | Number of bits | Description |
|---|---|---|
| Center 26-tone RU | 1 | This field is present only if(#15510) the value of the Bandwidth field of HE-SIG-A field in an HE MU PPDU is set to greater than 1.<br>If the Bandwidth field of the HE-SIG-A field in an HE MU PPDU is set to 2, 4 or 5 for 80 MHz:<br>Set to 1 to indicate that a user is allocated to the center 26-tone RU (see FIG. 28-7 (RU locations in an 80 MHz HE PPDU(#16528))); otherwise, set to 0. The same value is applied to both HE-SIG-B content channels.<br>If the Bandwidth field of the HE-SIG-A field in an HE MU PPDU is set to 3, 6 or 7 for 160 MHz or 80 + 80 MHz:<br>For HE-SIG-B content channel 1, set to 1 to indicate that a user is allocated to the center 26-tone RU of the lower frequency 80 MHz; otherwise, set to 0.<br>For HE-SIG-B content channel 2, set to 1 to indicate that a user is allocated to the center 26-tone RU of the higher frequency 80 MHz; otherwise, set to 0. |
| CRC | 4 | See 28.3.10.7.3 (CRC computation) |
| Tail | 6 | Used to terminate the trellis of the convolutional decoder. Set to 0 |

The RU allocation subfield included in the common field of the HE-SIG-B may be configured with 8 bits and may indicate as follows with respect to 20 MHz PPDU bandwidth. RUs to be used as a data portion in the frequency domain are allocated using an index for RU size and disposition in the frequency domain. The mapping between an 8-bit RU allocation subfield for RU allocation and the number of users per RU may be defined as follows.

TABLE 9

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 00000000 | 26 | 26 | 26 | 26 | 26 | 26 | 26 | 26 | 26 | 1 |
| 00000001 | 26 | 26 | 26 | 26 | 26 | 26 | 26 | 52 | | 1 |
| 00000010 | 26 | 26 | 26 | 26 | 26 | 52 | | 26 | 26 | 1 |
| 00000011 | 26 | 26 | 26 | 26 | 26 | 52 | | 52 | | 1 |
| 00000100 | 26 | 26 | 52 | | 26 | 26 | 26 | 26 | 26 | 1 |
| 00000101 | 26 | 26 | 52 | | 26 | 26 | 26 | 52 | | 1 |
| 00000110 | 26 | 26 | 52 | | 26 | 52 | | 26 | 26 | 1 |
| 00000111 | 26 | 26 | 52 | | 26 | 52 | | 52 | | 1 |
| 00001000 | 52 | | 26 | 26 | 26 | 26 | 26 | 26 | 26 | 1 |
| 00001001 | 52 | | 26 | 26 | 26 | 26 | 26 | 52 | | 1 |
| 00001010 | 52 | | 26 | 26 | 26 | 52 | | 26 | 26 | 1 |
| 00001011 | 52 | | 26 | 26 | 26 | 52 | | 52 | | 1 |
| 00001100 | 52 | | 52 | | 26 | 26 | 26 | 26 | 26 | 1 |
| 00001101 | 52 | | 52 | | 26 | 26 | 26 | 52 | | 1 |
| 00001110 | 52 | | 52 | | 26 | 52 | | 26 | 26 | 1 |
| 00001111 | 52 | | 52 | | 26 | 52 | | 52 | | 1 |
| 00010$y_2y_1y_0$ | 52 | | 52 | | — | | 106 | | | 8 |
| 00011$y_2y_1y_0$ | | | 106 | | — | 52 | | 52 | | 8 |
| 00100$y_2y_1y_0$ | 26 | 26 | 26 | 26 | 26 | | 106 | | | 8 |
| 00101$y_2y_1y_0$ | 26 | 26 | | 52 | 26 | | 106 | | | 8 |
| 00110$y_2y_1y_0$ | 52 | | 26 | 26 | 26 | | 106 | | | 8 |
| 00111$y_2y_1y_0$ | 52 | | 52 | | 26 | | 106 | | | 8 |
| 01000$y_2y_1y_0$ | | | 106 | | 26 | 26 | 26 | 26 | | 8 |
| 01001$y_2y_1y_0$ | | | 106 | | 26 | 26 | 26 | 52 | | 8 |
| 01010$y_2y_1y_0$ | | | 106 | | 26 | 52 | | 26 | 26 | 8 |
| 01011$y_2y_1y_0$ | | | 106 | | 26 | 52 | | 52 | | 8 |
| 0110$y_1y_0z_1z_0$ | | | 106 | | — | | 106 | | | 16 |
| 01110000 | 52 | | 52 | | — | 52 | | 52 | | 1 |
| 01110001 | 242-tone RU empty | | | | | | | | | 1 |
| 01110010 | 484-tone RU with zero User fields indicated in this RU Allocation subfield of the HE-SIG-B content channel | | | | | | | | | 1 |
| 01110011 | 996-tone RU with zero User fields indicated in this RU Allocation subfield of the HE-SIG-B content channel | | | | | | | | | 1 |
| 011101$x_1x_0$ | Reserved | | | | | | | | | 4 |
| 01111$y_2y_1y_0$ | Reserved | | | | | | | | | 8 |
| 10$y_2y_1y_0z_2z_1z_0$ | | | 106 | | 26 | | 106 | | | 64 |
| 11000$y_2y_1y_0$ | | | | | 242 | | | | | 8 |

TABLE 9-continued

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 11001$y_2y_1y_0$ | | | | | 484 | | | | | 8 |
| 11010$y_2y_1y_0$ | | | | | 996 | | | | | 8 |
| 11011$y_2y_1y_0$ | | | | | Reserved | | | | | 8 |
| 111$x_4x_3x_2x_1x_0$ | | | | | Reserved | | | | | 32 |

If(#Ed) signaling RUs of size greater than 242 subcarriers, $y_2y_1y_0$ = 000-111 indicates number of User fields in the HE-SIG-B content channel that contains the corresponding 8-bit RU Allocation subfield. Otherwise, $y_2y_1y_0$ = 000-111 indicates number of STAs multiplexed in the 106-tone RU, 242-tone RU or the lower frequency 106-tone RU if there are two 106-tone RUs and one 26-tone RU is assigned between two 106-tone RUs. The binary vector $y_2y_1y_0$ indicates $2^2 \times y_2 + 2^1 \times y_1 + y_0 + 1$ STAs multiplexed the RU.
$z_2z_1z_0$ = 000-111 indicates number of STAs multiplexed in the higher frequency 106-tone RU if there are two 106-tone RUs and one 26-tone RU is assigned between two 106-tone RUs. The binary vector $z_2z_1z_0$ indicates $2^2 \times z_2 + 2^1 \times z_1 + z_0 + 1$ STAs multiplexed in the RU.
Similarly, $y_1y_0$ = 00-11 indicates number of STAs multiplexed in the lower frequency 106-tone RU. The binary vector $y_1y_0$ indicates $2^1 \times y_1 + y_0 + 1$ STAs multiplexed in the RU.
Similarly, $z_1z_0$ = 00-11 indicates the number of STAs multiplexed in the higher frequency 106-tone RU. The binary vector $z_1z_0$ indicates $2^1 \times z_1 + z_0 + 1$ STAs multiplexed in the RU.
1 to #9 (from left to the right) is ordered in increasing order of the absolute frequency.
$x_1x_0$ = 00-11, $x_4x_3x_2x_1x_0$ = 00000-11111.
'—' means no STA in that RU.

The user-specific field included in the second control field (HE-SIG-B, 740) may include a user field, a CRC field, and a Tail field. The format of the user-specific field may be defined as follows.

TABLE 10

| Subfield | Number of bits | Description |
|---|---|---|
| User field | N × 21 | The User field format for a non-MU-MIMO allocation is defined in Table 28-26 (User field format for a non-MU-MIMO allocation). The User field format for a MU-MIMO allocation is defined in Table 28-27 (User field for an MU-MIMO allocation). N = 1 if it is the last User Block field, and if there is only one user in the last User Block field. N = 2 otherwise. |
| CRC | 4 | The CRC is calculated over bits 0 to 20 for a User Block field that contains one User field, and bits 0 to 41 for a User Block field that contains two User fields. See 28.3.10.7.3 (CRC computation). |
| Tail | 6 | Used to terminate the trellis of the convolutional decoder. Set to 0. |

Also, the user-specific field of the HE-SIG-B is composed of a plurality of user fields. The plurality of user fields are located after the common field of the HE-SIG-B. The location of the RU allocation subfield of the common field and that of the user field of the user-specific field are used together to identify an RU used for transmitting data of an STA. A plurality of RUs designated as a single STA are now allowed in the user-specific field. Therefore, signaling that allows an STA to decode its own data is transmitted only in one user field.

As an example, it may be assumed that the RU allocation subfield is configured with 8 bits of 01000010 to indicate that five 26-tone RUs are arranged next to one 106-tone RU and three user fields are included in the 106-tone RU. At this time, the 106-tone RU may support multiplexing of the three users. This example may indicate that eight user fields included in the user-specific field are mapped to six RUs, the first three user fields are allocated according to the MU-MIMO scheme in the first 106-tone RU, and the remaining five user fields are allocated to each of the five 26-tone RUs.

A user field included in the user-specific field of the HE-SIG-B may be defined as follows. First, the user field for non-MU-MIMO allocation is as follows.

TABLE 12

| Bit | Subfield | Number of bits | Description |
|---|---|---|---|
| B0-B10 | STA-ID | 11 | Set to a value of the element indicated from TXVECTOR parameter STA_ID_LIST (see 27.11.1 (STA_ID_LIST)). |
| B11-B13 | NSTS | 3 | Number of space-time streams. Set to the number of space-time streams minus 1. |
| B14 | Beam-formed (#16038) | 1 | Use of transmit beamforming. Set to 1 if a beamforming steering matrix is applied to the waveform in an SU transmission. Set to 0 otherwise. |
| B15-B18 | MCS | 4 | Modulation and coding scheme Set to n for MCSn, where n = 0, 1 ,2 . . . , 11 Values 12 to 15 are reserved |

TABLE 12-continued

| Bit | Subfield | Number of bits | Description |
|-----|----------|----------------|-------------|
| B19 | DCM | 1 | Indicates whether or not DCM is used.<br>Set to 1 to indicate that the payload(#Ed) of the corresponding user of the HE MU PPDU is modulated with DCM for the MCS.<br>Set to 0 to indicate that the payload of the corresponding user of the PPDU is not modulated with DCM for the MCS.<br>NOTE-DCM is not applied in combination with STBC.(#15664) |
| B20 | Coding | 1 | Indicates whether BCC or LDPC is used.<br>Set to 0 for BCC<br>Set to 1 for LDPC |

NOTE-
If the STA-ID subfield is set to 2046, then the other subfields can be set to arbitrary values.(#15946)

The user field for MU-MIMO allocation is as follows.

TABLE 13

| Bit | Subfield | Number of bits | Description |
|-----|----------|----------------|-------------|
| B0-B10 | STA-ID | 11 | Set to a value of element indicated from TXVECTOR parameter STA_ID_LIST (see 27.11.1 (STA_ID_LIST)). |
| B11-B14 | Spatial Configuration | 4 | Indicates the number of spatial streams for a STA in an MU-MIMO allocation (see Table 28-28 (Spatial Configuration subfield encoding)). |
| B15-B18 | MCS | 4 | Modulation and coding scheme.<br>Set to n for MCSn, where n = 0, 1, 2, . . . , 11<br>Values 12 to 15 are reserved |
| B19 | Reserved | 1 | Reserved and set to 0 |
| B20 | Coding | 1 | Indicates whether BCC or LDPC is used.<br>Set to 0 for BCC<br>Set to 1 for LDPC |

NOTE-
If the STA-ID subfield is set to 2046, then the other subfields can be set to arbitrary values.(#15946)

Figure 12:
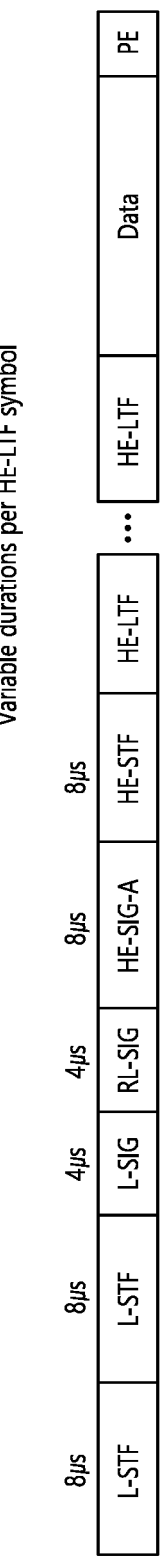
FIG. 12 illustrates one example of an HE TB PPDU.

FIG. 12 illustrates an example of an HE TB PPDU. The PPDU of FIG. 12 illustrates an uplink PPDU transmitted in response to the trigger frame of FIG. 9. At least one STA receiving a trigger frame from an AP may check the common information field and the individual user information field of the trigger frame and may transmit an HE TB PPDU simultaneously with another STA which has received the trigger frame.

As shown in the figure, the PPDU of FIG. 12 includes various fields, each of which corresponds to the field shown in FIGS. 2, 3, and 7. Meanwhile, as shown in the figure, the HE TB PPDU (or uplink PPDU) of FIG. 12 may not include the HE-SIG-B field but only the HE-SIG-A field.

1. Embodiment Applicable to the Present Disclosure

The existing WiFi system uses a TDD scheme to operate DL transmission in which transmission is performed from an AP to an STA and UL transmission in which transmission is performed from the STA to the AP. In this case, in order for the STA to perform UL transmission, DL reception is performed and thereafter UL transmission is performed. Therefore, a time delay occurs to transmit data through UL transmission. Alternatively, in order for the AP to perform DL transmission, UL reception is performed and thereafter DL transmission is performed. Therefore, a time delay occurs to transmit data through DL transmission.

Compared to an FDD system, a TDD system may increase frequency efficiency because DL/UL are located at the same frequency, but has a disadvantage in that a delay is great because transmission and reception are performed in such a manner that DL/UL are separated in terms of time.

Meanwhile, in AR/VR, video information and user's motion information shall be transmitted and received in an interworking manner without latency. If the latency or disconnection occurs in the interworking of the video information and the user's motion information, an AR/VR performance experienced by a user is significantly degraded, which leads to a bottle neck in replacing the existing wired AR/VR with wirelessly one.

Therefore, the proposed method proposes a method for increasing the performance experienced by the user while replacing the AR/VR with wireless one.

The present specification proposes a series of processes and signalling to enable faster UL transmission compared to the existing wireless LAN system. A PPDU format for support this is also proposed.

2. Proposed Embodiment

Figure 13:
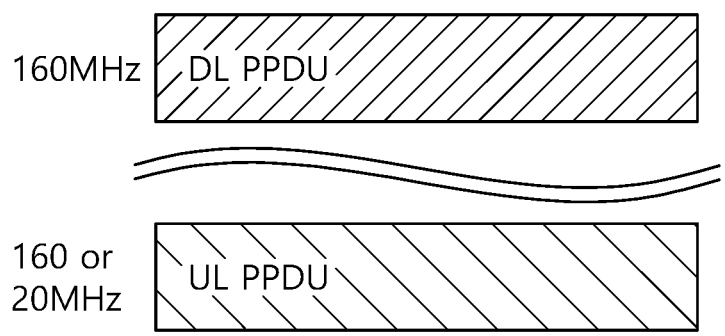
FIG. 13 is an example of applying FDD in a Wi-Fi system.

FIG. 13 is an example of applying FDD in a Wi-Fi system. That is, FDD is applied to the existing Wi-Fi system.

In the example of FIG. 13, a DL carrier occupies 160 MHz and a UL carrier occupies 160 MHz or 20 MHz. However, this is only an example, and thus DL and UL may occupy different bandwidths (BWs). The BW of DL and the BW of UL are not necessarily identical.

In addition, DL and UL may be located in the same band or located in different bands. For example, DL may be defined in a 5 GHz band, and UL may be defined in a 2.4 GHz band. The other way around is also possible.

Meanwhile, in the proposed method, a carrier on which DL is transmitted is defined as a primary channel. It is assumed herein that DL traffic is greater than UL traffic and an STA for performing DL transmission is an AP/PCP.

In order to operate as described above, an RF chain shall be configured separately for each DL and UL. In addition, in order to perform transmission and reception at the same time, two baseband modules are required.

Figure 14:
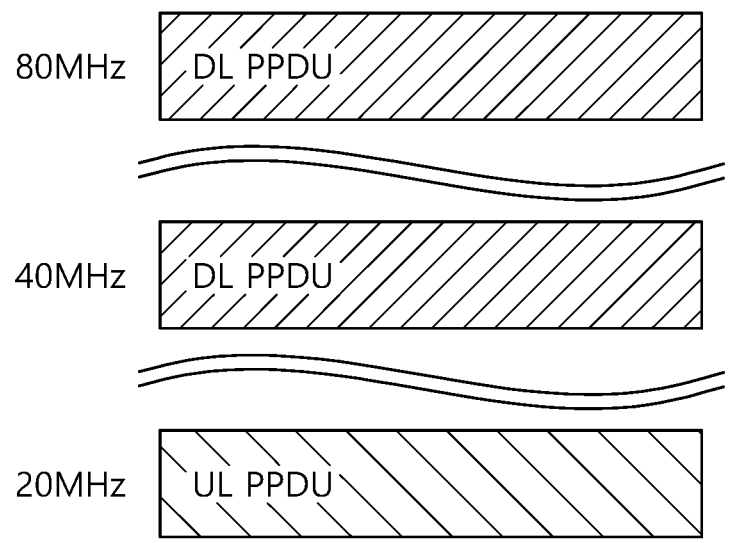
FIG. 14 shows an example in which DL or UL transmission operates with a plurality of carriers in a Wi-Fi system.

FIG. 14 shows an example in which DL or UL transmission operates with a plurality of carriers in a Wi-Fi system.

In the example of FIG. 14, DL transmission is performed through two carriers, and UL transmission is performed through one carrier. In addition, it is an example for a case where each of DL carriers does not have the same BW and a UL carrier does not have the same BW, either. That is, the proposed method proposes a scheme in which each of carriers does not have the same BW.

Specifically, in the proposed method, a carrier having the greatest BW is selected as a primary channel. That is, secondary channels cannot have a greater BW compared to the primary channel. This is because the Wi-Fi system operates a basic CCA operation by using the primary channel. That is, the existing Wi-Fi system performs transmission by using two channels only when the primary channel and the secondary channel are both idle, and performs transmission by using only the primary channel when only the secondary channel is busy. However, when the primary channel is busy, transmission is not possible even if the secondary channel is idle.

In this case, if the secondary channel has a greater BW compared to the primary channel, a throughput experienced by a user may differ significantly according to whether the secondary channel is idle/busy.

For example, comparing a case where the BW of the primary channel is greater than the BW of the secondary channel with the opposite case, whether the primary channel is idle/busy has the same effect on the two cases since it determines as a whole whether transmission is performed. However, according to whether the secondary channel is idle/busy, the former case (when the BW of the primary channel is greater than the BW of the secondary channel) may perform transmission through a primary channel occupying a wider BW, whereas the latter case (when the BW of the primary channel is smaller than the BW of the secondary channel) shall perform transmission through a primary channel occupying a narrower BW. Therefore, a throughput difference is great in the latter case, compared to a case where the primary channel and the secondary channel are both idle.

In the proposed method, two or more UL carriers may be allocated to one DL carrier in FIG. 14. That is, 80 MHz of FIG. 14 may be used for the DL carrier, and 40 MHz and 20 MHz of FIG. 14 may be used for the UL carrier. This is to guarantee a UL throughput by aggregating several channels when a channel which can be allocated to UL is very small.

Meanwhile, when FDD is configured as shown in FIG. 13 and FIG. 14, a problem occurs in UL channel access. That is, when an STA attempts channel access to a UL carrier to transmit UL data, a corresponding channel may be busy due to a co-located AP or OB SS in which the channel is used. In this case, there is a problem in that the STA cannot perform UL transmission. Since this may lead to a failure in achieving the purpose of introducing FDD to solve the low latency described above, a frame structure as shown in FIG. 15 is proposed.

Figure 15:
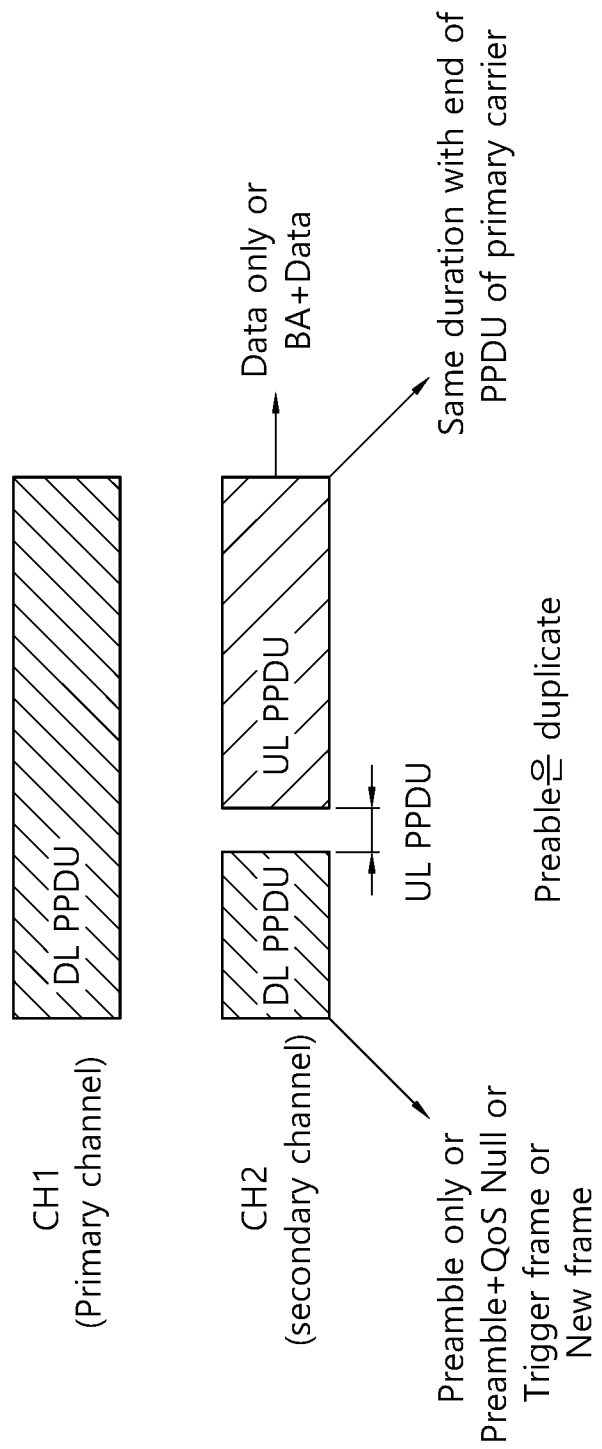
FIG. 15 shows an example of a frame structure capable of transmitting a DL PPDU through a primary channel and a UL PPDU through a secondary channel.

FIG. 15 shows an example of a frame structure capable of transmitting a DL PPDU through a primary channel and a UL PPDU through a secondary channel.

It is assumed in FIG. 15 that CH1 is assigned as a primary channel and used for DL, and CH2 is assigned as a secondary channel and used for UL. However, in order to solve the aforementioned problem, an AP simultaneously transmits a DL PPDU through the secondary channel. In this case, the DL PPDU transmitted through the secondary channel may be a preamble only frame or a Preamble+QoS null frame, or may be newly defined to effectively operate the proposed method. In this case, the preamble may include L-STF, L-LTF, and L-SIG, and may additionally include FDD-SIG to effectively operate the proposed method. In addition, the preamble transmitted through the secondary channel is transmitted in a duplicate format such that transmission is performed in the same manner as the preamble used in the primary channel. In doing so, when legacy STAs detect and decode even any one of the primary channel and the secondary channel, it can be recognized that a corresponding channel is occupied.

In the proposed method of FIG. 15, an STA which has received the DL PPDU transmitted through the secondary channel transmits a UL PPDU after an SIFS. Alternatively, a value other than the SIFS may be applied (e.g., a value greater than SIFS and smaller than PIFS), and an IFS value may be indicated in a configurable manner through a beacon frame, a management frame, and a control frame.

Although the UL PPDU of FIG. 15 may be a frame composed of only data, an ACK frame for a DL PPDU received through a previous primary channel may be aggregated with data, or it may be composed of only the ACK frame. This means that, when the ACK frame is transmitted, the ACK frame for the primary channel is transmitted through the secondary channel. In addition, it means that a preamble only DL PPDU transmitted through the secondary channel does not require ACK. In this case, the ACK frame also includes a block ACK frame.

Figure 16:
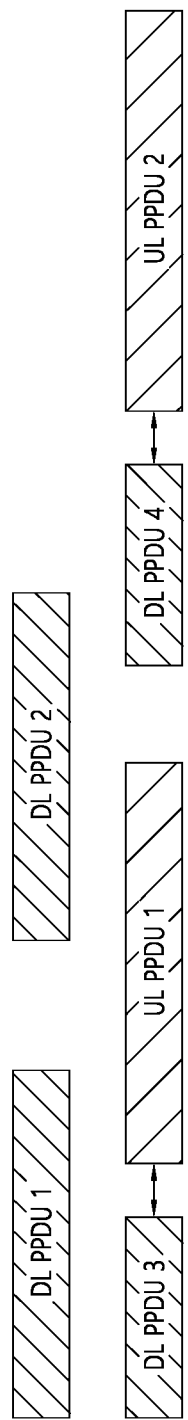
FIG. 16 shows an example of a frame structure to which FDD is applied when a length of a UL PPDU is longer than a length of a DL PPDU.

FIG. 16 shows an example of a frame structure to which FDD is applied when a length of a UL PPDU is longer than a length of a DL PPDU.

Meanwhile, a maximum length of the UL PPDU is set to be equal to or shorter than an end point of the DL PPDU transmitted through a primary channel. This is to avoid a problem in which a separate CCA operation is forced for each channel, irrespective of whether CCA is performed on a primary channel, and thus a hardware (HW) complexity increases. This is caused when an AP shall perform CCA on a secondary channel to transmit a DL PPDU 4 in the middle of transmitting a DL PPDU 2 in a case where the UL PPDU is longer than the DL PPDU as shown in FIG. 16.

In addition, with this configuration, since PPDUs transmitted through the secondary channel shall indicate length information of a UL PPDU transmitted by STAs after an SIFS, there is a problem in that the aforementioned preamble only DL PPDU structure cannot be used. That is, since a preamble of PPDUs transmitted through the secondary channel is composed of a duplicate format of a preamble transmitted through the primary channel, L-SIG information indicates a length of a PPDU transmitted through the primary channel, and a MAC frame shall be included to guarantee up to the UL PPDU.

Figure 17:
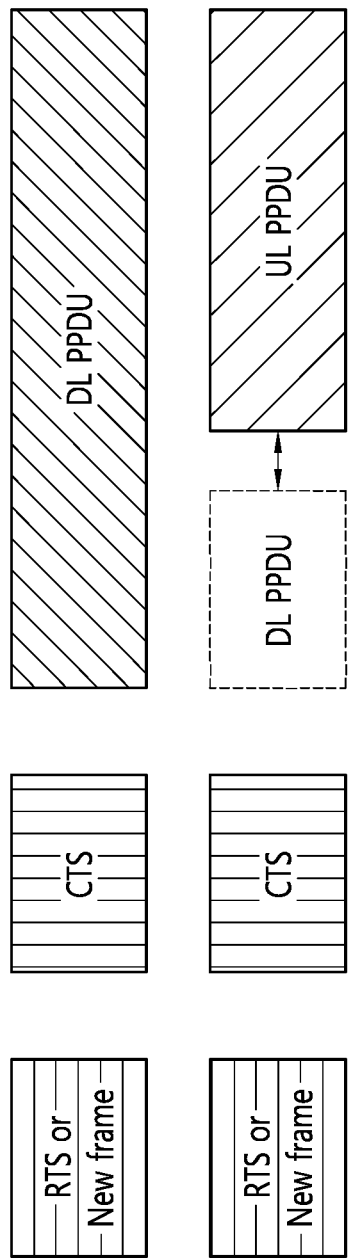
FIG. 17 is an example of a frame structure to which FDD is applied by using an RTS frame and a CTS frame.

In the proposed method, BW information of the primary channel and secondary channel may be indicated by FDD-SIG which is newly defined. Alternatively, it may be indicated through request to send (RTS) and clear to send (CTS) frames as shown in FIG. 17. The RTS frame and the CTS frame are signaling frames for solving a hidden node problem and an exposed node problem, and a wireless device may overhear whether data is transmitted and received between neighboring STAs, based on the RTS frame and the CTS frame.

FIG. 17 is an example of a frame structure to which FDD is applied by using an RTS frame and a CTS frame.

In case of FIG. 17, a center frequency or a channel number and BW information may be included in the RTS and CTS frames, and a new frame may be configured for indication.

Figure 18:
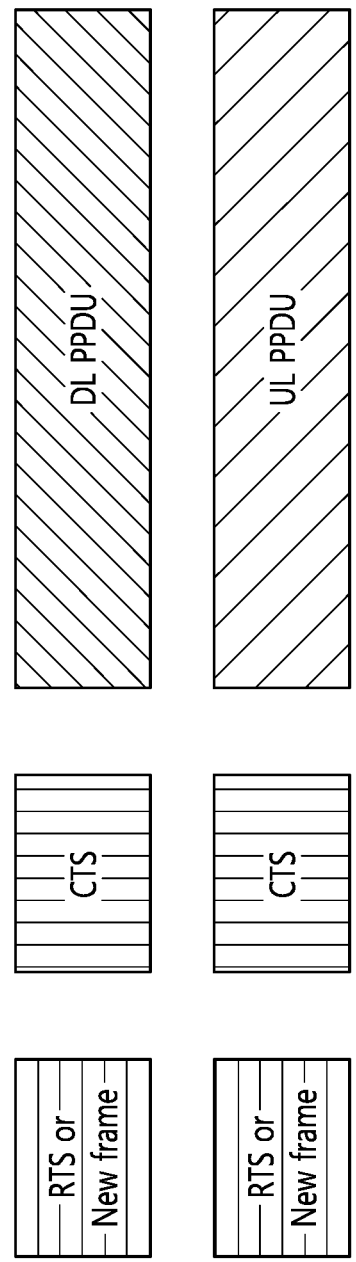
FIG. 18 is another example of a frame structure to which FDD is applied by using an RTS frame and a CTS frame.

FIG. 18 is another example of a frame structure to which FDD is applied by using an RTS frame and a CTS frame.

In addition, if the RTS frame uses 1 bit to indicate that a UL frame is transmitted in a corresponding channel, a UL PPDU may be immediately transmitted after an SIFS of CRS without transmission or assistance of a DL PPDU in a secondary channel. An embodiment for this is shown in FIG. 18.

Figure 19:
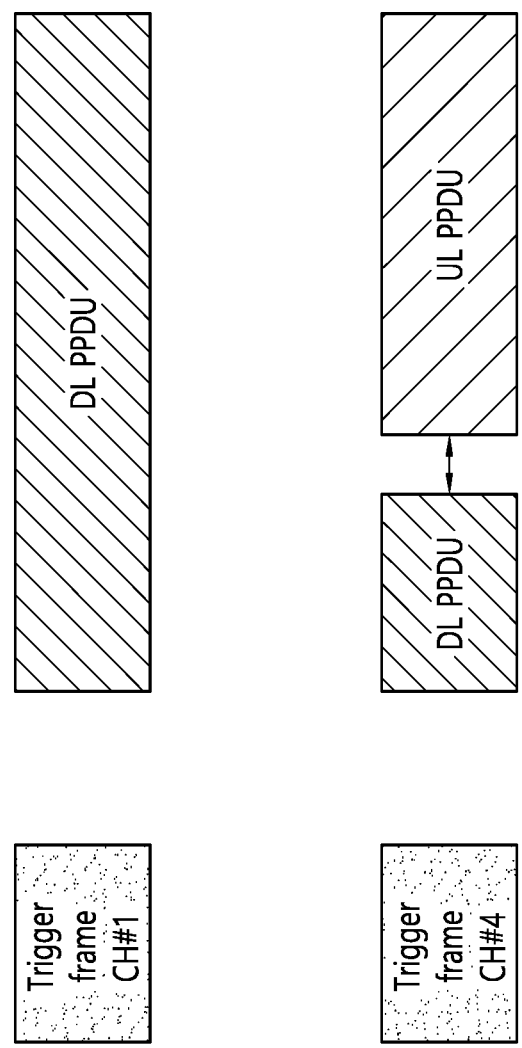
FIG. 19 and FIG. 20 are examples of a frame structure to which FDD is applied by using a trigger frame.
Figure 20:
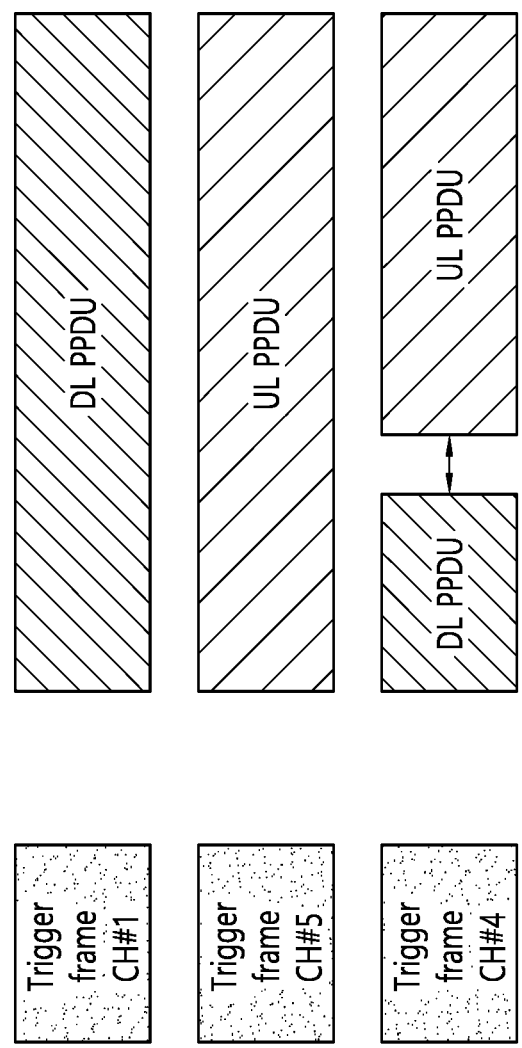

FIG. 19 and FIG. 20 are examples of a frame structure to which FDD is applied by using a trigger frame.

FIG. 19 is an embodiment in which two STAs use CH #1 and CH #4 to perform FDD transmission, and FIG. 20 is an embodiment in which three STAs use CH #1, CH #5, and CH #4 to perform FDD transmission.

Referring to FIG. 19 and FIG. 20, transmission may be performed by using the trigger frame without having to use an RTS/CTS frame.

In FIG. 19 and FIG. 20, the trigger frame may include a center frequency, a channel number, a BW, a DL/UL indication, a DL/UL PPDU duration, or DL/UL TXOP duration information. In addition, a method of configuring a DL PPDU and a UL PPDU in terms of time in a corresponding channel may be included for flexibility of a time resource, so that DL/UL can be freely changed in each channel. In this case, although a trigger frame transmitted through each channel may be transmitted by including only information on each channel as shown in FIG. 19, it is also possible that the trigger frame is configured by using information on all channels and may be transmitted by using a duplicate format, so that configuration information on all channels can be recognized even if only any one of the channels is received.

However, there is a case where a data part (PSDU) included in a DL PPDU of CH #4 is transmitted by being aggregated with a trigger frame of CH #4. If so, a DL PPDU may be transmitted by being included in a trigger frame in CH #4 of FIG. 19 and FIG. 20, and a UL PPDU may be transmitted when an SIFS elapses after the trigger frame is received. In this case, however, a trigger frame for each channel shall be configured independently without having to use a duplicate format.

Hereinafter, the aforementioned embodiment is described over time with reference to FIG. 20.

Figure 21:
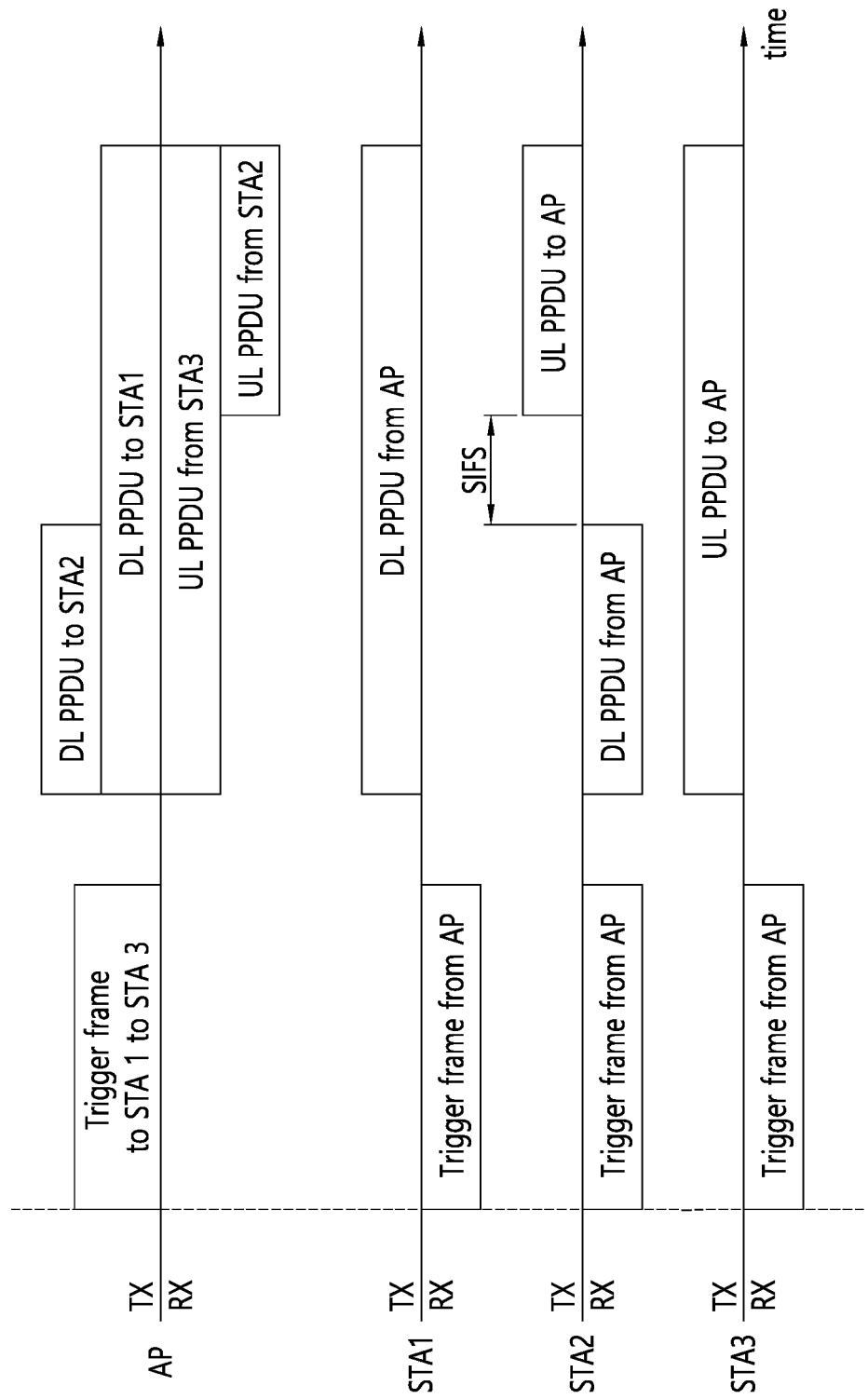
FIG. 21 shows a procedure in which a PPDU is transmitted based on FDD according to the present embodiment.

FIG. 21 shows a procedure in which a PPDU is transmitted based on FDD according to the present embodiment.

It is assumed in the embodiment of FIG. 21 that an AP supports an FDD scheme, and an STA supports a multi-band and the FDD scheme.

Referring to FIG. 21, the AP transmits a trigger frame to an STA1 to an STA3. The trigger frame includes bandwidth information of a primary channel and secondary channel and scheduling information of the STA1 to STA3.

The STA1 decodes the trigger frame to identify that the STA1 receives a DL PPDU by using the primary channel and FDD is applied thereto. In doing so, the STA1 may receive the DL PPDU from the AP through the primary channel.

The STA2 decodes the trigger frame to identify that the STA2 receives the DL PPDU by using the secondary channel and FDD is applied thereto. Likewise, the STA2 may receive the DL PPDU from the AP and transmit the UL PPDU to the AP after an SIFS. That is, by being divided in a time domain, the DL PPDU is first received through the secondary channel, and thereafter the UL PPDU is transmitted.

The STA3 may decode the trigger frame to identify that the STA3 transmits the UL PPDU by using another secondary channel and FDD is applied thereto. In doing so, the STA3 may transmit the UL PPDU assigned thereto in another secondary channel to the AP. According to FIG. 21, the PPDU transmitted and received by the first to third STAs may be simultaneously transmitted in different frequency bands.

The FDD-based PPDU transmission will be described below in detail with reference to FIG. 22 and FIG. 23.

Figure 22:
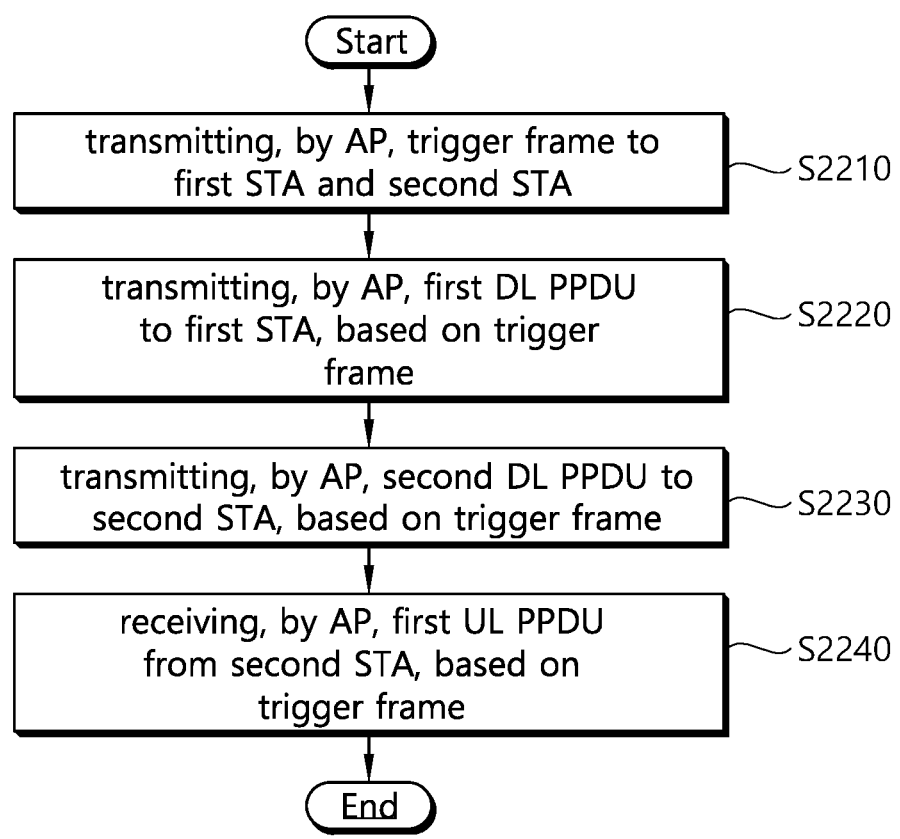
FIG. 22 is a flowchart illustrating a procedure in which a PPDU is transmitted and received based on FDD from an AP perspective according to the present embodiment.

FIG. 22 is a flowchart illustrating a procedure in which a PPDU is transmitted and received based on FDD from an AP perspective according to the present embodiment.

An example of FIG. 22 may be performed in a network environment in which a next-generation WLAN system is supported. The next-generation WLAN system is a WLAN system evolved from an 802.11ax system, and may satisfy backward compatibility with the 802.11ax system.

The example of FIG. 22 may be performed in a transmitting device, and the transmitting device may correspond to an AP. A receiving device of FIG. 22 may correspond to an STA (non-AP STA) having FDD capability.

In step S2210, the AP transmits a trigger frame to a first STA and a second STA.

In step S2220, the AP transmits a first DL PPDU to the first STA, based on the trigger frame.

In step S2230, the AP transmits a second DL PPDU to the second STA, based on the trigger frame.

In step S2240, the AP receives a first UL PPDU from the second STA, based on the trigger frame.

The trigger frame includes bandwidth information of a primary channel and secondary channel.

The first DL PPDU is transmitted through the primary channel, and the second DL PPDU and the first UL PPDU are transmitted through the secondary channel.

The first and second DL PPDUs are simultaneously transmitted. The first DL PPDU and the second DL PPDU may have the same transmission start time, but a transmission end time may be different from each other.

The first UL PPDU is received when a pre-set duration elapses after the second DL PPDU is transmitted. That is, the first UL PPDU and the second DL PPDU are identical in a frequency domain, and may be identified in a time domain.

The trigger frame, the first DL and second DL PPDUs, and the first UL PPDU may be a frame or PPDU used in the 802.11ax system, or may be newly defined in the next-generation WLAN system.

The first DL PPDU may include a first preamble and a first data field. The second DL PPDU may include only a second preamble, or may include the second preamble and a quality of service (QoS) null frame.

The second preamble may be a preamble obtained by duplicating the first preamble.

The second preamble may include a legacy-short training field (L-STF), a legacy-long training field (L-LTF), a legacy-signal (L-SIG), and an FDD-signal (FDD-SIG). The FDD-SIG may include bandwidth information of the primary channel and secondary channel.

The pre-set duration may be set to a first duration or a second duration. The first duration may be a short inter-frame space (SIFS), and the second duration may be a duration having a value greater than the SIFS and less than a point coordination function inter-frame space (PIFS).

The first UL PPDU may include only a second data field, or may include only an ACK frame for the first DL PPDU, or may include a frame obtained by aggregating the second data field and the ACK frame. The ACK frame may include a block Ack (BA) frame.

The first UL PPDU may not include an ACK frame for the second DL PPDU. In practice, the ACK frame for the second DL PPDU is not required.

A transmission end time of the first UL PPDU may be equal or prior to a transmission end time of the first DL PPDU. The L-SIG may include information on the transmission end time of the first DL PPDU.

The trigger frame may further include information on a center frame, a channel number of the primary channel and secondary channel, indication information of DL and UL PPDUs, duration information of the DL and UL PPDUs, and transmission opportunity (TXOP) information of the DL and UL PPDUs.

The trigger frame may include a first trigger frame transmitted in the primary channel and a second trigger frame transmitted in the secondary channel.

The second trigger frame may be obtained by duplicating the first trigger frame.

If the second trigger frame is aggregated with a physical layer service data unit (PSDU) included in the second DL PPDU, the first UL PPDU may be received when an SIFS elapses after the trigger frame is transmitted. In this case, the second trigger frame may be composed of independent trigger frames, instead of duplicating the first trigger frame.

Figure 23:
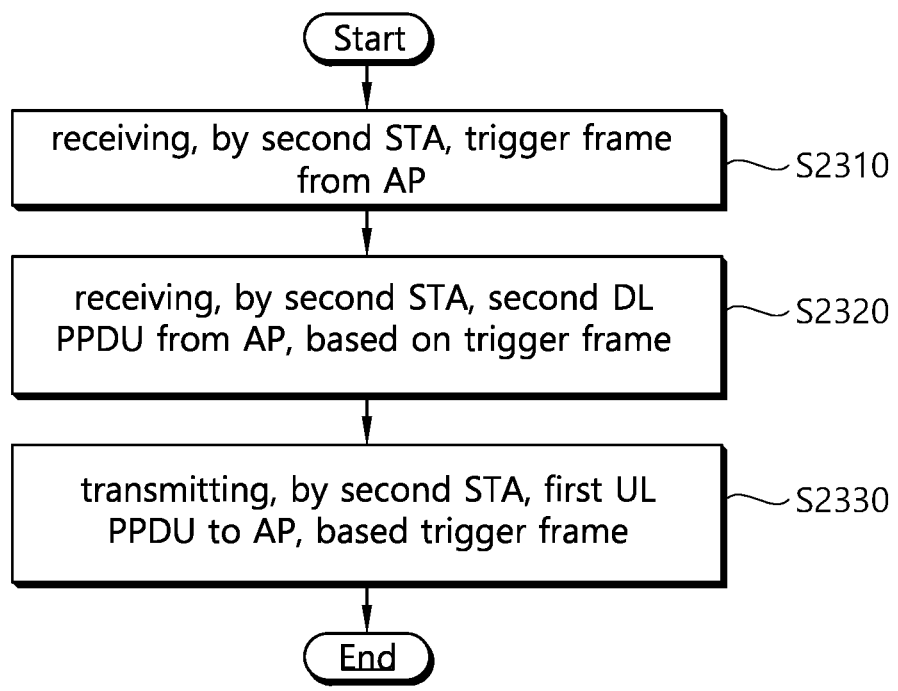
FIG. 23 is a flowchart illustrating a procedure in which a PPDU is transmitted and received based on FDD from an STA perspective according to the present embodiment.

FIG. 23 is a flowchart illustrating a procedure in which a PPDU is transmitted and received based on FDD from an STA perspective according to the present embodiment.

An example of FIG. 23 may be performed in a network environment in which a next-generation WLAN system is supported. The next-generation WLAN system is a WLAN system evolved from an 802.11ax system, and may satisfy backward compatibility with the 802.11ax system.

The example of FIG. 23 may be performed in a receiving device, and the receiving device may correspond to an STA (non-AP STA) having FDD capability. A transmitting device of FIG. 23 may correspond to an AP.

In step S2310, a second STA receives a trigger frame from the AP.

In step S2320, the second STA receives a second DL PPDU from the AP, based on the trigger frame.

In step S2330, the second STA transmits a first UL PPDU to the AP, based on the trigger frame.

In this case, the trigger frame is received by a first STA from the AP, and the first DL PPDU is received by the first STA, based on the trigger frame.

The trigger frame includes bandwidth information of a primary channel and secondary channel.

The first DL PPDU is transmitted through the primary channel, and the second DL PPDU and the first UL PPDU are transmitted through the secondary channel.

The first and second DL PPDUs are simultaneously transmitted. The first DL PPDU and the second DL PPDU may have the same transmission start time, but a transmission end time may be different from each other.

The first UL PPDU is received when a pre-set duration elapses after the second DL PPDU is transmitted. That is, the first UL PPDU and the second DL PPDU are identical in a frequency domain, and may be identified in a time domain.

The trigger frame, the first DL and second DL PPDUs, and the first UL PPDU may be a frame or PPDU used in the 802.11ax system, or may be newly defined in the next-generation WLAN system.

The first DL PPDU may include a first preamble and a first data field. The second DL PPDU may include only a second preamble, or may include the second preamble and a quality of service (QoS) null frame.

The second preamble may be a preamble obtained by duplicating the first preamble.

The second preamble may include a legacy-short training field (L-STF), a legacy-long training field (L-LTF), a legacy-signal (L-SIG), and an FDD-signal (FDD-SIG). The FDD-SIG may include bandwidth information of the primary channel and secondary channel. The pre-set duration may be set to a first duration or a second duration. The first duration may be a short inter-frame space (SIFS), and the second duration may be a duration having a value greater than the SIFS and less than a point coordination function inter-frame space (PIFS).

The first UL PPDU may include only a second data field, or may include only an ACK frame for the first DL PPDU, or may include a frame obtained by aggregating the second data field and the ACK frame. The ACK frame may include a block Ack (BA) frame.

The first UL PPDU may not include an ACK frame for the second DL PPDU. In practice, the ACK frame for the second DL PPDU is not required.

A transmission end time of the first UL PPDU may be equal or prior to a transmission end time of the first DL PPDU. The L-SIG may include information on the transmission end time of the first DL PPDU.

The trigger frame may further include information on a center frame, a channel number of the primary channel and secondary channel, indication information of DL and UL PPDUs, duration information of the DL and UL PPDUs, and transmission opportunity (TXOP) information of the DL and UL PPDUs.

The trigger frame may include a first trigger frame transmitted in the primary channel and a second trigger frame transmitted in the secondary channel.

The second trigger frame may be obtained by duplicating the first trigger frame.

If the second trigger frame is aggregated with a physical layer service data unit (PSDU) included in the second DL PPDU, the first UL PPDU may be received when an SIFS elapses after the trigger frame is transmitted. In this case, the second trigger frame may be composed of independent trigger frames, instead of duplicating the first trigger frame.

3. Device Configuration

Figure 24:
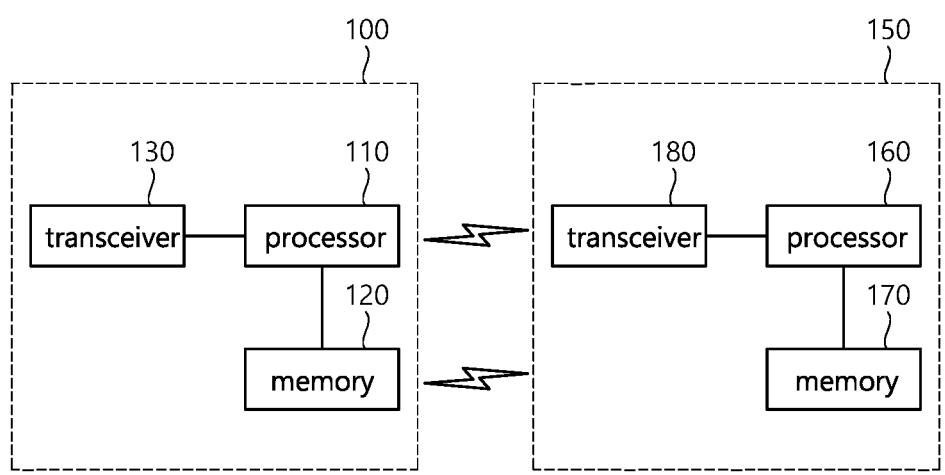
FIG. 24 is a diagram showing a device for implementing the above-described method.

FIG. 24 is a diagram illustrating a device for implementing the aforementioned method.

A wireless device 100 of FIG. 24 is a transmission device capable of implementing the aforementioned embodiment, and may operate as an AP STA. A wireless device 150 of FIG. 24 is a receiving device capable of implementing the aforementioned embodiment, and may operate as a non-AP STA.

The transmitting device (100) may include a processor (110), a memory (120), and a transmitting/receiving unit (130), and the receiving device (150) may include a processor (160), a memory (170), and a transmitting/receiving unit (180). The transmitting/receiving unit (130, 180) transmits/receives a radio signal and may be operated in a physical layer of IEEE 802.11/3GPP, and so on. The processor (110, 160) may be operated in the physical layer and/or MAC layer and may be operatively connected to the transmitting/receiving unit (130, 180).

The processor (110, 160) and/or the transmitting/receiving unit (130, 180) may include application-specific integrated circuit (ASIC), other chip set, logic circuit and/or data processor. The memory (120, 170) may include read-only memory (ROM), random access memory (RAM), flash memory, memory card, storage medium and/or other storage unit. When the embodiments are executed by software, the techniques (or methods) described herein can be executed with modules (e.g., processes, functions, and so on) that perform the functions described herein. The modules can be stored in the memory (120, 170) and executed by the processor (110, 160). The memory (120, 170) can be implemented (or positioned) within the processor (110, 160) or external to the processor (110, 160). Also, the memory (120, 170) may be operatively connected to the processor (110, 160) via various means known in the art.

The processor 110, 160 may implement the functions, processes and/or methods proposed in the present disclosure. For example, the processor 110, 160 may perform the operation according to the present embodiment.

An operation of the processor 110 of the transmitting device is described in detail as follows. The processor 110 of the transmitting device transmits a trigger frame to a first STA and a second STA, and transmits and receives a first DL PPDU, a second DL PPDU, a first UL PPDU to and from the first STA and the second STA, based on the trigger frame.

An operation of the processor 160 of the receiving device is described in detail as follows. The processor 160 of the receiving device receives a trigger frame from the AP, and transmits and receives a first DL PPDU, a second DL PPDU, and a first UL PPDU to and from the AP, based on the trigger frame.

Figure 25:
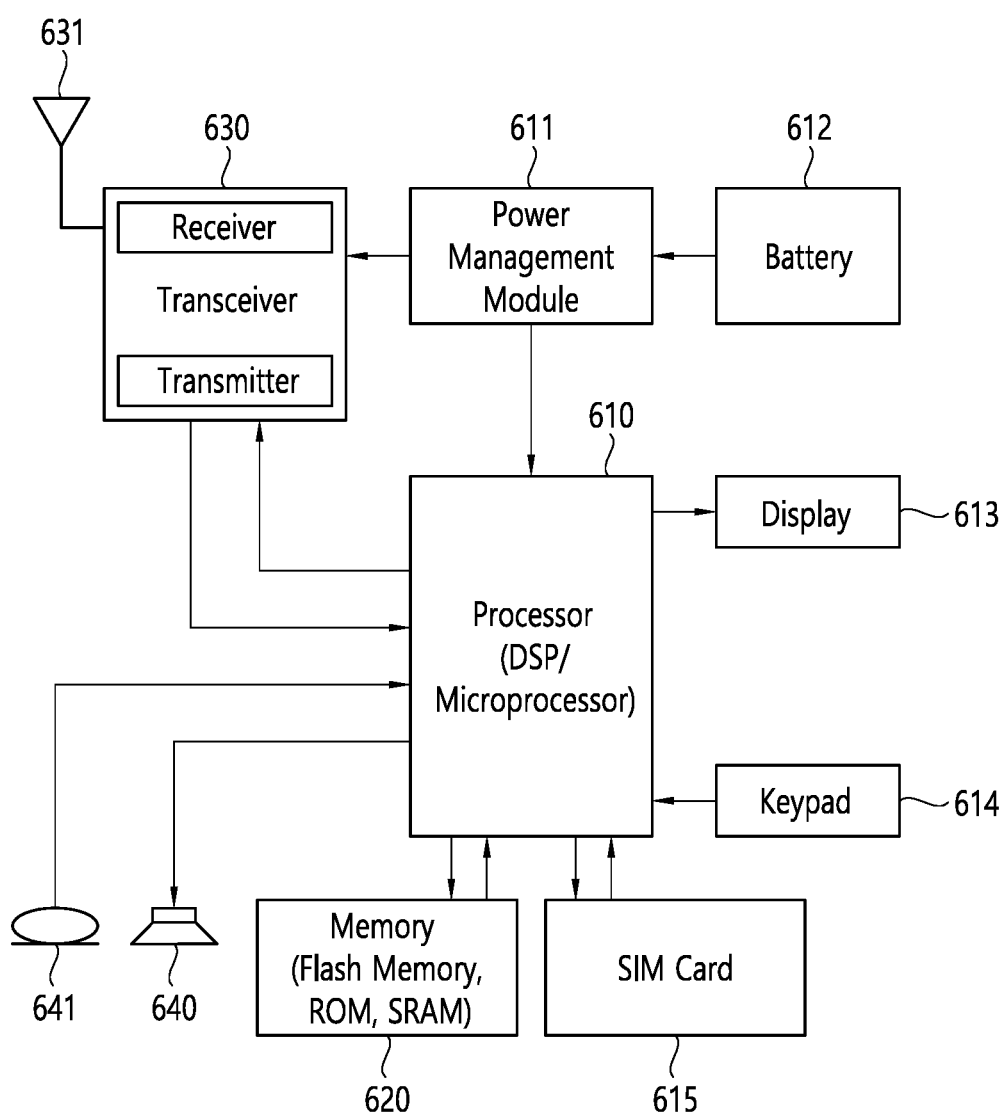
FIG. 25 shows a more detailed wireless device implementing an exemplary embodiment of the present disclosure.

FIG. 25 shows more detailed wireless device to implement an embodiment of the present disclosure. The present disclosure described above for the transmitting device or the receiving device may be applied to this embodiment.

A wireless device includes a processor 610, a power management module 611, a battery 612, a display 613, a keypad 614, a subscriber identification module (SIM) card 615, a memory 620, a transceiver 630, one or more antennas 631, a speaker 640, and a microphone 641.

The processor 610 may be configured to implement proposed functions, procedures and/or methods described in this description. Layers of the radio interface protocol may be implemented in the processor 610. The processor 610 may include ASIC, other chipset, logic circuit and/or data processing device. The processor 610 may be an application processor (AP). The processor 610 may include at least one of a digital signal processor (DSP), a central processing unit (CPU), a graphics processing unit (GPU), a modem (modulator and demodulator). An example of the processor 610 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The power management module 611 manages power for the processor 610 and/or the transceiver 630. The battery 612 supplies power to the power management module 611. The display 613 outputs results processed by the processor 610. The keypad 614 receives inputs to be used by the processor 610. The keypad 614 may be shown on the display 613. The SIM card 615 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The memory 620 is operatively coupled with the processor 610 and stores a variety of information to operate the processor 610. The memory 620 may include ROM, RAM, flash memory, memory card, storage medium and/or other storage device. When the embodiments are implemented in software, the techniques described herein can be implemented with modules (e.g., procedures, functions, and so on) that perform the functions described herein. The modules can be stored in the memory 620 and executed by the processor 610. The memory 620 can be implemented within the processor 610 or external to the processor 610 in which case those can be communicatively coupled to the processor 610 via various means as is known in the art.

The transceiver 630 is operatively coupled with the processor 610, and transmits and/or receives a radio signal. The transceiver 630 includes a transmitter and a receiver. The transceiver 630 may include baseband circuitry to process radio frequency signals. The transceiver 630 controls the one or more antennas 631 to transmit and/or receive a radio signal.

The speaker 640 outputs sound-related results processed by the processor 610. The microphone 641 receives sound-related inputs to be used by the processor 610.

In case of the transmitting device, the processor 610 transmits a trigger frame to a first STA and a second STA, and transmits and receives a first DL PPDU, a second DL PPDU, a first UL PPDU to and from the first STA and the second STA, based on the trigger frame.

In case of the receiving device, the processor 610 receives a trigger frame from the AP, and transmits and receives a first DL PPDU, a second DL PPDU, and a first UL PPDU to and from the AP, based on the trigger frame.

The trigger frame includes bandwidth information of a primary channel and secondary channel.

The first DL PPDU is transmitted through the primary channel, and the second DL PPDU and the first UL PPDU are transmitted through the secondary channel.

The first and second DL PPDUs are simultaneously transmitted. The first DL PPDU and the second DL PPDU may have the same transmission start time, but a transmission end time may be different from each other.

The first UL PPDU is received when a pre-set duration elapses after the second DL PPDU is transmitted. That is, the first UL PPDU and the second DL PPDU are identical in a frequency domain, and may be identified in a time domain.

The trigger frame, the first DL and second DL PPDUs, and the first UL PPDU may be a frame or PPDU used in the 802.11ax system, or may be newly defined in the next-generation WLAN system.

The first DL PPDU may include a first preamble and a first data field. The second DL PPDU may include only a second preamble, or may include the second preamble and a quality of service (QoS) null frame.

The second preamble may be a preamble obtained by duplicating the first preamble.

The second preamble may include a legacy-short training field (L-STF), a legacy-long training field (L-LTF), a legacy-signal (L-SIG), and an FDD-signal (FDD-SIG). The FDD-SIG may include bandwidth information of the primary channel and secondary channel.

The pre-set duration may be set to a first duration or a second duration. The first duration may be a short inter-frame space (SIFS), and the second duration may be a duration having a value greater than the SIFS and less than a point coordination function inter-frame space (PIFS).

The first UL PPDU may include only a second data field, or may include only an ACK frame for the first DL PPDU, or may include a frame obtained by aggregating the second data field and the ACK frame. The ACK frame may include a block Ack (BA) frame.

The first UL PPDU may not include an ACK frame for the second DL PPDU. In practice, the ACK frame for the second DL PPDU is not required.

A transmission end time of the first UL PPDU may be equal or prior to a transmission end time of the first DL PPDU. The L-SIG may include information on the transmission end time of the first DL PPDU.

The trigger frame may further include information on a center frame, a channel number of the primary channel and secondary channel, indication information of DL and UL PPDUs, duration information of the DL and UL PPDUs, and transmission opportunity (TXOP) information of the DL and UL PPDUs.

The trigger frame may include a first trigger frame transmitted in the primary channel and a second trigger frame transmitted in the secondary channel.

The second trigger frame may be obtained by duplicating the first trigger frame.

If the second trigger frame is aggregated with a physical layer service data unit (PSDU) included in the second DL PPDU, the first UL PPDU may be received when an SIFS elapses after the trigger frame is transmitted. In this case, the second trigger frame may be composed of independent trigger frames, instead of duplicating the first trigger frame.

What is claimed is:

1. A method in a wireless local area network (WLAN) system, the method comprising:
   receiving, by a non-access point multi-link device (non-AP MLD), a first data from an AP MLD; and
   transmitting, by the non-AP MLD, a second data to the AP MLD,
   wherein the non-AP MLD includes a first non-AP station (STA) and a second non-AP STA,
   wherein the AP MLD includes a first AP and a second AP,
   wherein the AP MLD sets up first and second links with the non-AP MLD, and
   wherein the second AP receives the second data from the second non-AP STA through the second link, while the first AP transmits the first data to the first non-AP STA through the first link.

2. The method of claim 1,
   wherein a third data is transmitted from the second AP to the second non-AP STA,
   wherein the first data comprises a first preamble and a first data field,
   wherein the third data comprises only a second preamble or comprises the second preamble and a quality of service (QoS) null frame, and
   wherein the second preamble is a preamble obtained by duplicating the first preamble.

3. The method of claim 2,
   wherein the second preamble comprises a legacy-short training field (L-STF), a legacy-long training field (L-LTF), a legacy-signal (L-SIG), and an FDD-signal (FDD-SIG), and
   wherein the FDD-SIG comprises bandwidth information of the first link and the second link.

4. The method of claim 1,
   wherein the pre-set duration is set to a first duration or a second duration,
   wherein the first duration is a short inter-frame space (SIFS), and
   wherein the second duration is a duration having a value greater than the SIFS and less than a point coordination function inter-frame space (PIFS).

5. The method of claim 1,
   wherein the second data comprises only a second data field, or comprises only an ACK frame for the first data, or comprises a frame obtained by aggregating the second data field and the ACK frame, and
   wherein the ACK frame comprises a block Ack (BA) frame.

6. The method of claim 5,
   wherein the second data does not include an ACK frame for the third data, and
   wherein the ACK frame for the third data is not required.

7. The method of claim 3,
   wherein a transmission end time of the second data is equal or prior to a transmission end time of the first data, and
   wherein the L-SIG comprises information on the transmission end time of the first data.

8. The method of claim 1, further comprising:
   wherein a trigger frame is transmitted from the AP MLD to the non-AP MLD,
   wherein the trigger frame comprises bandwidth information of the first link and the second link, information on a center frame, a channel number of the first link and the second link, indication information of DL and UL PPDUs, duration information of the DL and UL PPDUs, and transmission opportunity (TXOP) information of the DL and UL PPDUs, and
   wherein the trigger frame further comprises a first trigger frame transmitted in the first link and a second trigger frame transmitted in the second link.

9. The method of claim 8, wherein the second trigger frame is obtained by duplicating the first trigger frame.

10. The method of claim 8, wherein if the second trigger frame is aggregated with a physical layer service data unit (PSDU) comprised in the third data, the second data is received when an SIFS elapses after the trigger frame is transmitted.

11. A non-access point multi-link device (non-AP MLD) in a wireless local area network (WLAN) system, the non-AP MLD comprising:
   a memory;
   a transceiver; and
   a processor operatively coupled to the memory and the transceiver, wherein the processor is configured to:
   receive a first data from an AP MLD; and
   transmit a second data to the AP MLD,
   wherein the non-AP MLD includes a first non-AP station (STA) and a second non-AP STA,
   wherein the AP MLD includes a first AP and a second AP,
   wherein the AP MLD sets up first and second links with the non-AP MLD, and wherein the second AP receives the second data from the second non-AP STA through the second link, while the first AP transmits the first data to the first non-AP STA through the first link.

12. The method of claim 11,
wherein a third data is transmitted from the second AP to the second non-AP STA,
wherein the first data comprises a first preamble and a first data field,
wherein the third data comprises only a second preamble or comprises the second preamble and a quality of service (QoS) null frame, and
wherein the second preamble is a preamble obtained by duplicating the first preamble.

13. The method of claim 12,
wherein the second preamble comprises a legacy-short training field (L-STF), a legacy-long training field (L-LTF), a legacy-signal (L-SIG), and an FDD-signal (FDD-SIG), and
wherein the FDD-SIG comprises bandwidth information of the first link and the second link.

14. The method of claim 11,
wherein the pre-set duration is set to a first duration or a second duration,
wherein the first duration is a short inter-frame space (SIFS), and
wherein the second duration is a duration having a value greater than the SIFS and less than a point coordination function inter-frame space (PIFS).

15. The method of claim 11,
wherein the second data comprises only a second data field, or comprises only an ACK frame for the first data, or comprises a frame obtained by aggregating the second data field and the ACK frame, and
wherein the ACK frame comprises a block Ack (BA) frame.

16. The method of claim 15,
wherein the second data does not include an ACK frame for the third data, and
wherein the ACK frame for the third data is not required.

17. The method of claim 13,
wherein a transmission end time of the second data is equal or prior to a transmission end time of the first data, and
wherein the L-SIG comprises information on the transmission end time of the first data.

18. The method of claim 11, further comprising:
wherein a trigger frame is transmitted from the AP MLD to the non-AP MLD,
wherein the trigger frame comprises bandwidth information of the first link and the second link, information on a center frame, a channel number of the first link and the second link, indication information of DL and UL PPDUs, duration information of the DL and UL PPDUs, and transmission opportunity (TXOP) information of the DL and UL PPDUs, and
wherein the trigger frame further comprises a first trigger frame transmitted in the first link and a second trigger frame transmitted in the second link.

19. The method of claim 18, wherein the second trigger frame is obtained by duplicating the first trigger frame.

20. A method in a wireless local area network (WLAN) system, the method comprising:
transmitting, by an access point multi-link device (AP MLD), a first data to a non-AP MLD; and
receiving, by the AP MLD, a second data from the non-AP MLD,
wherein the non-AP MLD includes a first non-AP station (STA) and a second non-AP STA,
wherein the AP MLD includes a first AP and a second AP,
wherein the AP MLD sets up first and second links with the non-AP MLD, and
wherein the second AP receives the second data from the second non-AP STA through the second link, while the first AP transmits the first data to the first non-AP STA through the first link.

* * * * *